US012659823B2

(12) United States Patent
Hsieh et al.

(10) Patent No.: US 12,659,823 B2
(45) Date of Patent: Jun. 16, 2026

(54) IDENTIFICATION AND HANDLING OF CONDITIONAL PROCEDURE

(71) Applicant: GOOGLE LLC, Mountain View, CA (US)

(72) Inventors: Ching-Jung Hsieh, Mountain View, CA (US); Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 484 days.

(21) Appl. No.: 17/793,029

(22) PCT Filed: Jan. 13, 2021

(86) PCT No.: PCT/US2021/013240
§ 371 (c)(1),
(2) Date: Jul. 14, 2022

(87) PCT Pub. No.: WO2021/146286
PCT Pub. Date: Jul. 22, 2021

(65) Prior Publication Data
US 2023/0046878 A1     Feb. 16, 2023

Related U.S. Application Data

(60) Provisional application No. 62/961,183, filed on Jan. 14, 2020.

(51) Int. Cl.
*H04W 36/08*     (2009.01)
*H04W 36/00*     (2009.01)
*H04W 36/30*     (2009.01)

(52) U.S. Cl.
CPC ..... *H04W 36/0085* (2018.08); *H04W 36/304* (2023.05); *H04W 36/00698* (2023.05)

(58) Field of Classification Search
CPC ....... H04W 36/0085; H04W 36/00695; H04W 36/00698; H04W 36/304; H04W 36/34; H04W 36/36; H04W 36/362
See application file for complete search history.

(56) References Cited

U.S. PATENT DOCUMENTS

| | | | | |
|---|---|---|---|---|
| 11,310,862 B2 * | 4/2022 | Jin | .......................... | H04W 76/15 |
| 11,974,175 B2 * | 4/2024 | Zhang | ................. | H04W 36/362 |

(Continued)

FOREIGN PATENT DOCUMENTS

| | | | | |
|---|---|---|---|---|
| CA | 3095896 A1 * | 10/2019 | ............ | H04W 76/19 |
| CN | 110290560 A | 9/2019 | | |

(Continued)

OTHER PUBLICATIONS

International Search Report and Written Opinion for Application No. PCT/US2021/013240, dated May 3, 2021.

(Continued)

*Primary Examiner* — Siu M Lee
(74) *Attorney, Agent, or Firm* — MARSHALL, GERSTEIN & BORUN LLP

(57) ABSTRACT

A user equipment (UE) receives, from a radio access network (RAN), conditional configuration information including (i) a configuration related to a base station or a cell, and (ii) a condition to be satisfied before the UE applies the configuration (2102). The UE determines a procedure to which the conditional information pertains (2104). The UE applies, during the determined procedure, the configuration if the condition is satisfied (2106).

7 Claims, 15 Drawing Sheets

(56) References Cited

U.S. PATENT DOCUMENTS

| 12,004,027 | B2 * | 6/2024 | Latheef | H04W 36/305 |
| 12,069,526 | B2 * | 8/2024 | Tsuboi | H04W 36/18 |
| 12,219,635 | B2 * | 2/2025 | Da Silva | H04W 76/15 |
| 2019/0182883 | A1 * | 6/2019 | He | H04W 76/18 |
| 2019/0223073 | A1 | 7/2019 | Chen et al. | |
| 2019/0253937 | A1 | 8/2019 | Hsieh | |
| 2019/0373441 | A1 | 12/2019 | Ryu et al. | |
| 2020/0275519 | A1 | 8/2020 | Sharma et al. | |
| 2020/0383022 | A1 * | 12/2020 | Shrestha | H04W 36/0064 |
| 2022/0201582 | A1 * | 6/2022 | Eklöf | H04W 24/08 |
| 2022/0322174 | A1 * | 10/2022 | Da Silva | H04W 76/19 |
| 2022/0338089 | A1 * | 10/2022 | Kim | H04W 36/34 |
| 2022/0369172 | A1 * | 11/2022 | Hwang | H04W 74/08 |
| 2022/0377629 | A1 * | 11/2022 | Rugeland | H04W 36/0094 |
| 2022/0408323 | A1 * | 12/2022 | Ishii | H04W 36/362 |
| 2022/0408325 | A1 * | 12/2022 | Da Silva | H04W 76/15 |
| 2023/0007553 | A1 * | 1/2023 | Rugeland | H04W 36/362 |

FOREIGN PATENT DOCUMENTS

| CN | 110622559 | A | 12/2019 |
| EP | 2 983 407 | A1 | 2/2016 |
| WO | WO-2013/127480 | A1 | 9/2013 |
| WO | WO-2018/175721 | A1 | 9/2018 |
| WO | WO-2018175470 | A1 * | 9/2018 | H04W 24/00 |
| WO | WO-2019/066628 | A1 | 4/2019 |
| WO | WO-2020/001286 | A1 | 1/2020 |

OTHER PUBLICATIONS

Ericcson, "Conditional PSCell Addition/Change," 3GPP Draft (2019).
CATT (RAPPORTEUR), "Report on Email Discussion [107b#52] [NR MobE] Open Issues Conditional PSCell Addition/Change (CATT)," 3GPP Draft (2019).
CATT, "Consideration on SN Initiated Conditional SN Change Procedure," 3GPP Draft (2019).
"5G; NR; NR and NG-RAN Overall Description; Stage-2," 3GPP TS 38.300 version 16.2.0 Release 16 (2020).
CATT, "Draft stage-2 CR for Conditional PSCell Addition/ Change," 3GPP TSG-RAN2 Meeting #108 (2019).
Ericsson, "Running CR for Introduction of Even further Mobility enhancement in E-UTRAN," 3GPP TSG-RAN2 Meeting #108 (2019).
Intel Corporation, "RRC running CR for NR mobility on CHO ( [107bis#54])," 3GPP TSG-RAN WG2 Meeting #108 (2019).
Office Action for Chinese Application No. 202180019532.8, dated May 22, 2025.

* cited by examiner

300

400

600

800

900

1200

1300

1400

1500

1800

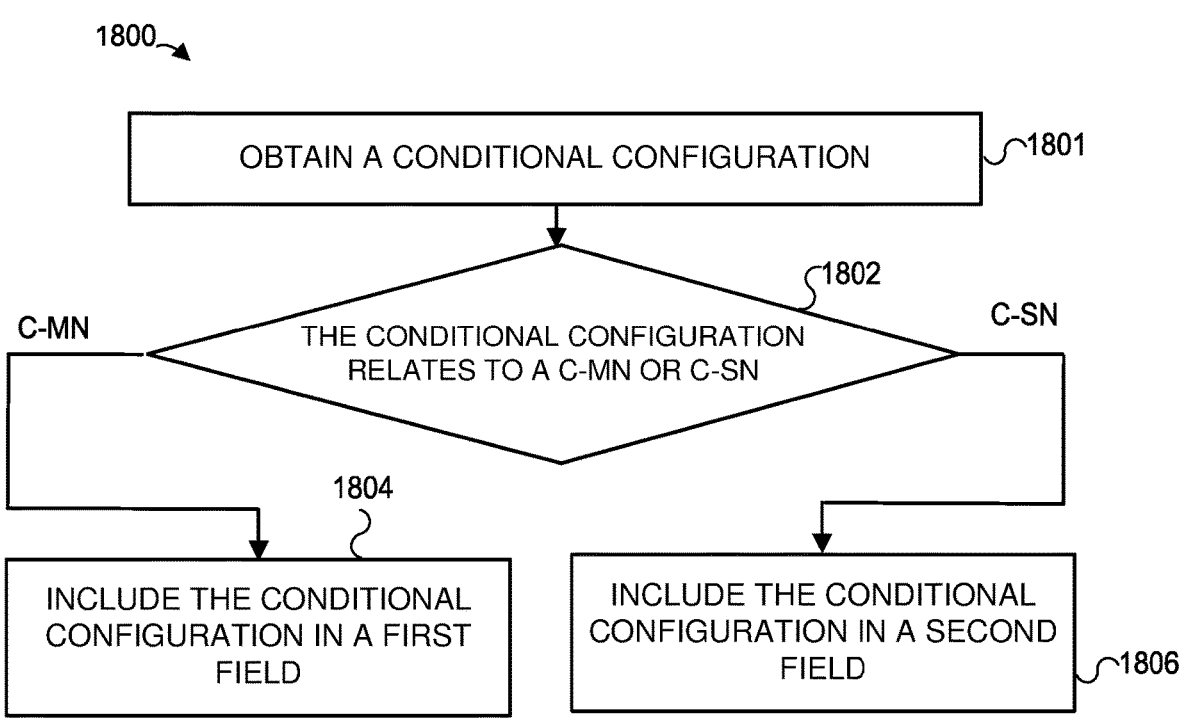

OBTAIN A CONDITIONAL CONFIGURATION — 1801

1802

C-MN     THE CONDITIONAL CONFIGURATION RELATES TO A C-MN OR C-SN     C-SN

1804

INCLUDE THE CONDITIONAL CONFIGURATION IN A FIRST FIELD

INCLUDE THE CONDITIONAL CONFIGURATION IN A SECOND FIELD — 1806

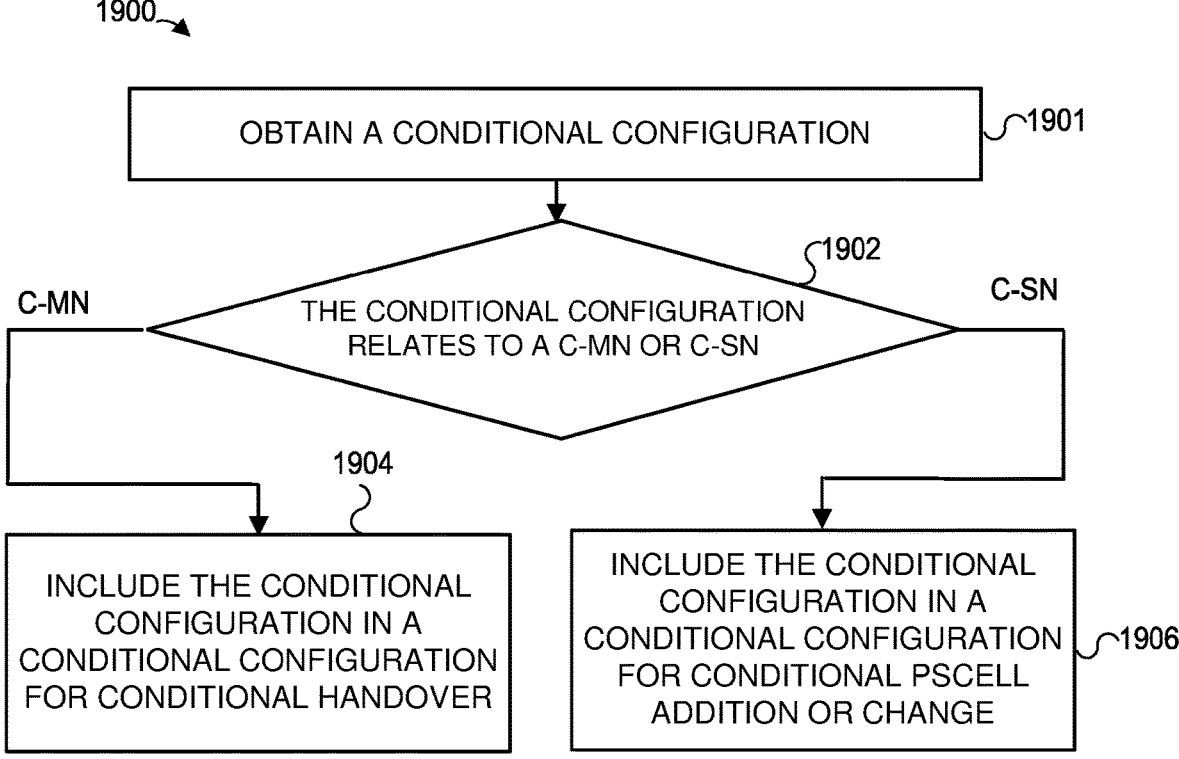

OBTAIN A CONDITIONAL CONFIGURATION — 1901

1902

C-MN     THE CONDITIONAL CONFIGURATION RELATES TO A C-MN OR C-SN     C-SN

1904

INCLUDE THE CONDITIONAL CONFIGURATION IN A CONDITIONAL CONFIGURATION FOR CONDITIONAL HANDOVER

INCLUDE THE CONDITIONAL CONFIGURATION IN A CONDITIONAL CONFIGURATION FOR CONDITIONAL PSCELL ADDITION OR CHANGE — 1906

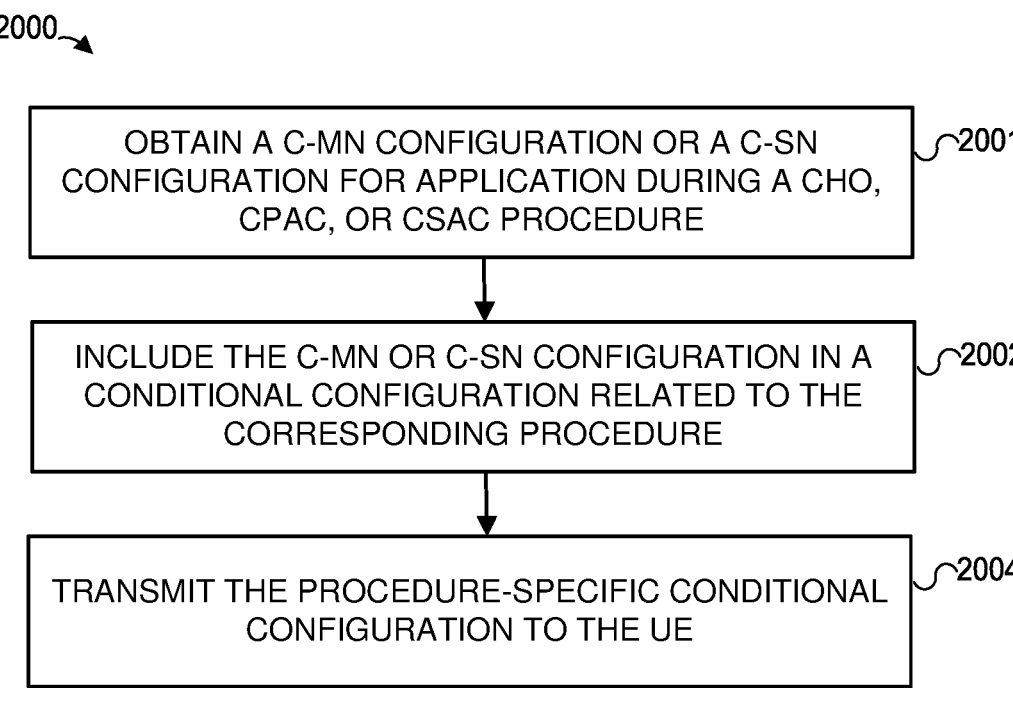

OBTAIN A C-MN CONFIGURATION OR A C-SN CONFIGURATION FOR APPLICATION DURING A CHO, CPAC, OR CSAC PROCEDURE ⟳2001

INCLUDE THE C-MN OR C-SN CONFIGURATION IN A CONDITIONAL CONFIGURATION RELATED TO THE CORRESPONDING PROCEDURE ⟳2002

TRANSMIT THE PROCEDURE-SPECIFIC CONDITIONAL CONFIGURATION TO THE UE ⟳2004

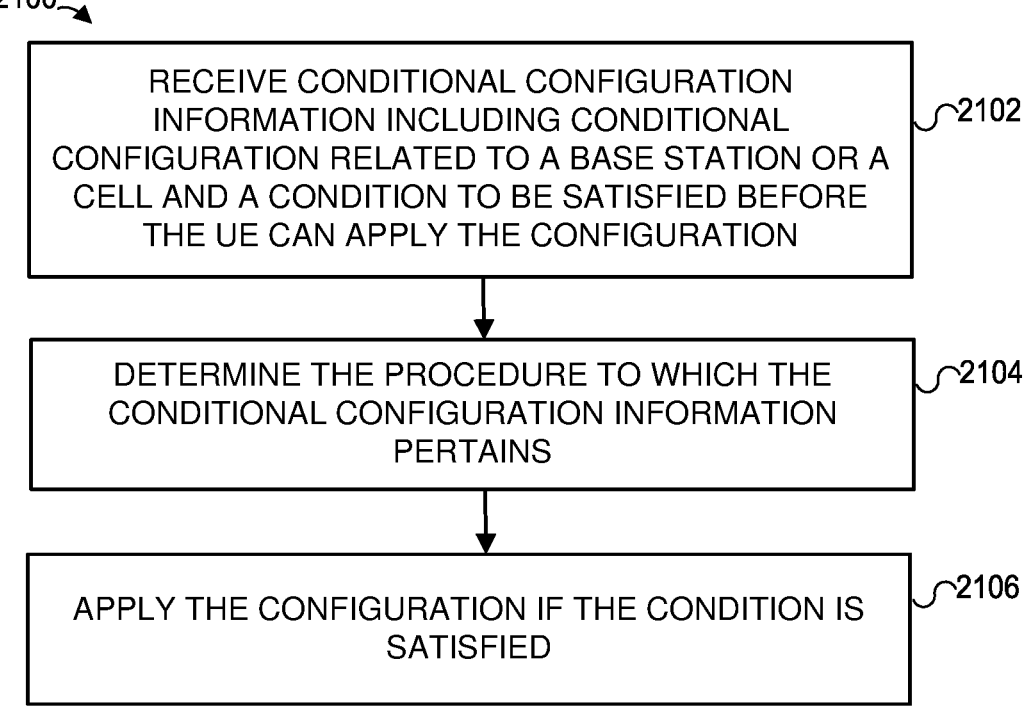

RECEIVE CONDITIONAL CONFIGURATION INFORMATION INCLUDING CONDITIONAL CONFIGURATION RELATED TO A BASE STATION OR A CELL AND A CONDITION TO BE SATISFIED BEFORE THE UE CAN APPLY THE CONFIGURATION ⟳2102

DETERMINE THE PROCEDURE TO WHICH THE CONDITIONAL CONFIGURATION INFORMATION PERTAINS ⟳2104

APPLY THE CONFIGURATION IF THE CONDITION IS SATISFIED ⟳2106

DETERMINE CONDITIONAL CONFIGURATION INFORMATION FOR A UE INCLUDING A CONFIGURATION AND A CONDITION    ⌇~2202

PROVIDE THE CONDITIONAL CONFIGURATION INFORMATION, TO THE UE    ⌇~2202

PROVIDE AN INDICATION OF A CONDITIONAL PROCEDURE TO WHICH THE CONDITIONAL CONFIGURATION INFORMATION PERTAINS, TO THE UE    ⌇~2206

IDENTIFICATION AND HANDLING OF CONDITIONAL PROCEDURE

This disclosure relates generally to wireless communications and, more particularly, to conditional procedures such as conditional handover, conditional primary secondary cell (PSCell) addition or change procedures, and conditional secondary node addition or change procedures (which is PSCell addition or change procedures with SN change).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG and the SCG can be referred to as split DRBs.

The UE in some scenarios can concurrently utilize resources of multiple RAN nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure.

3GPP technical specifications (TS) 36.300 and 38.300 describe procedures for handover (also called reconfiguration with sync) scenarios. These procedures involve messaging (e.g., RRC signaling and preparation) between RAN nodes that generally causes latency, which in turn increases the probability of failure for handover procedures. Some handover procedures do not involve conditions associated with the UE, and can be referred to as "immediate" handover procedures. Other handover procedures involve conditions associated with the UE, and 3GPP contributions R2-1914640 and R2-1914834 describe conditional handover scenarios.

3GPP specification TS 37.340 v15.7.0 describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These procedures, which do not involve conditions that are checked at the UE, can be referred to as "immediate" SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 38.401 v15.6.0, 36.300 v15.6.0 and 38.300 v15.6.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an "immediate" handover procedure.

More recently, for both SN or PSCell addition/change, "conditional" procedures have been considered (i.e., conditional SN or PSCell addition/change). Unlike the "immediate" procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., one or more random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied. A recent 3GPP document, R2-1914640, describes a data structure a base station can use to indicate a conditional configuration and a condition to be satisfied prior to applying the conditional configuration.

However, using the available mechanisms for receiving conditional information from a RAN, a UE is not always aware to which conditional procedure (handover, SN addition/change, PSCell addition/change) the received conditional information pertains. As a result, the UE may carry out a conditional procedure incorrectly. For example, the UE can incorrectly add or change a PSCell if the UE applies a received configuration for a conditional handover. As a more specific example, the UE can incorrectly initiate a random access procedure on a candidate cell. Conversely, the UE may incorrectly attempt to hand over to another base station or cell if the UE applies configuration for conditional SN addition or change during a conditional handover procedure. The handover may fail and result in the interruption of service.

Moreover, the RAN in some cases also may provide multiple measurement configurations (as described in 3GPP specification 38.331 v15.4.0 for example) for different respective procedures and use the same identifiers (Measld), and the UE may not be able to determine to which conditional procedure a certain measurement configuration pertains.

SUMMARY

A UE of this disclosure receives conditional configuration information including a configuration related to a base station or a cell, along with a condition to be satisfied before the UE can apply the configuration, determines to which conditional procedure the configuration pertains, and applies the configuration during the determined procedure when the condition is satisfied. Further, the UE in some cases receives multiple instances of measurement configuration from the base station and uses the techniques of this disclosure to select the measurement configuration corresponding to the received conditional configuration information. A base station of this disclosure can provide to the UE an indication of a conditional procedure during which the UE should apply conditional configuration information.

An example embodiment of these techniques is a method in a UE for conditionally carrying out a procedure. The method can be executed by processing hardware and includes receiving, from a RAN, conditional configuration information including (i) a configuration related to a base station or a cell, and (ii) a condition to be satisfied before the UE applies the configuration; determining a procedure to which the conditional information pertains; and applying, and during the determined procedure, the configuration if the condition is satisfied.

Another example embodiment of these techniques is a UE including processing hardware and configured to implement the method above.

Yet another example embodiment of these techniques is a method in a base station for configuring a UE. The method can be executed by processing hardware and includes determining, conditional configuration information for the UE, the conditional configuration information including (i) a configuration related to a radio access network (RAN) and (ii) a condition to be satisfied before the UE applies the configuration. The method further includes providing to the UE the conditional configuration information, and providing to the UE an indication of a procedure during which the UE is to apply the configuration if the condition is satisfied.

Another example embodiment of these techniques is a base station including processing hardware and configured to implement the method above.

BRIEF DESCRIPTION OF THE DRAWINGS

FIG. 18 is a flow diagram of an example method for providing conditional configuration to the UE using a dedicated field (or value, IE, etc.), which can be implemented in the MN or SN of FIG. 1A;

FIG. 19 is a flow diagram of an example method for associating conditional configuration for the UE with a conditional handover procedure or a conditional PSCell addition or change procedure, which can be implemented in a base station of FIG. 1A;

FIG. 20 is a flow diagram of an example method for providing conditional configuration to a UE using a procedure-specific conditional configuration, which can be implemented in a base station of FIG. 1A;

FIG. 21 is a flow diagram of an example method for carrying out a conditional procedure, which can be implemented in the UE of FIG. 1A.

DETAILED DESCRIPTION OF THE DRAWINGS

Figure 1A:
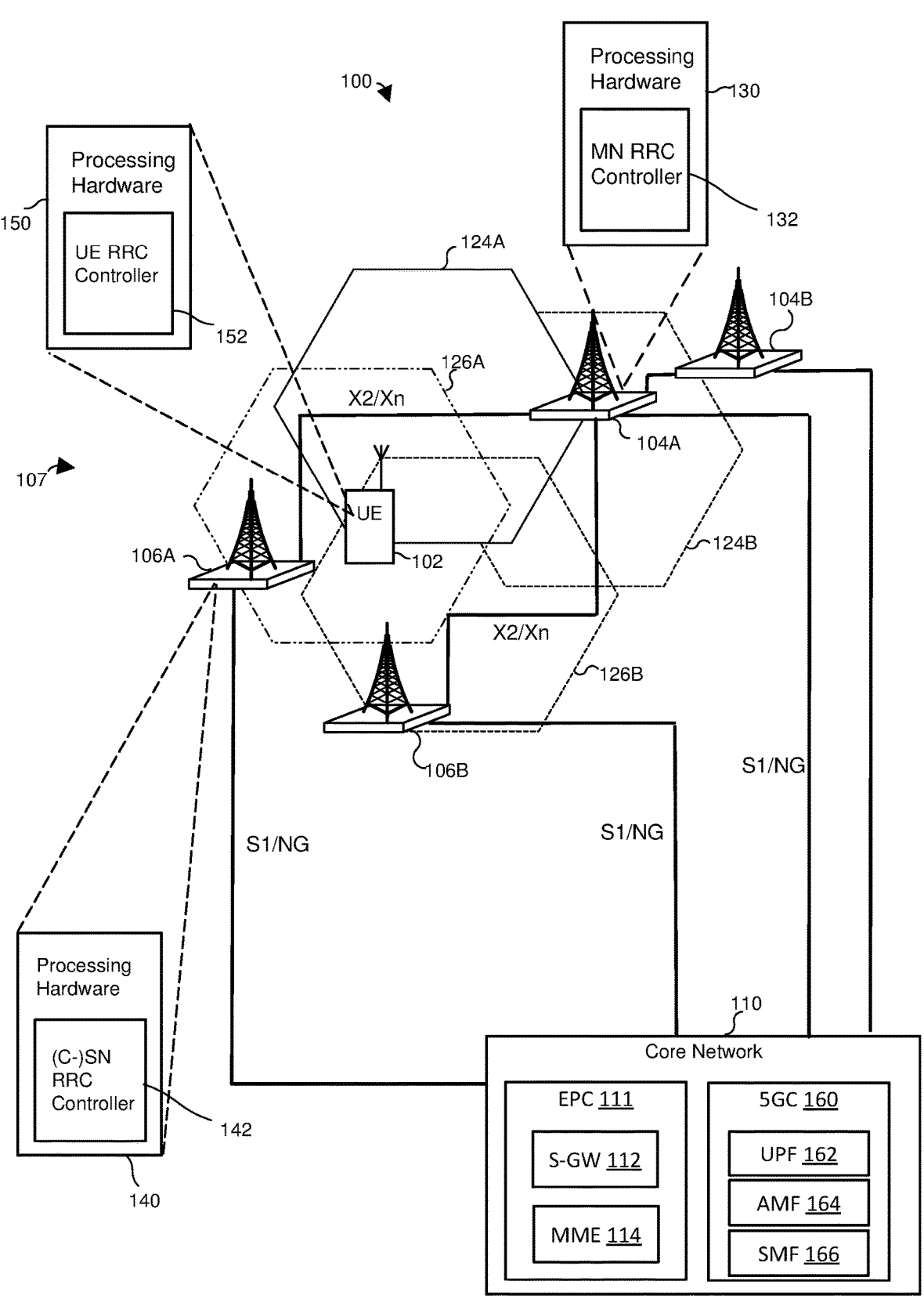
FIG. 1A is a block diagram of an example system in which a radio access network (RAN) and a user device (UE) can implement techniques of this disclosure for managing configurations associated with conditional procedures.

In general, the techniques of this disclosure allow a UE to receive a configuration related to a base station or a cell, along with a condition to be satisfied before the UE can apply the configuration, and determine to which conditional procedure the configuration pertains. The conditional procedure can be for example a conditional handover procedure, a conditional SN addition or change procedure, or a conditional PSCell addition or change procedure. In the discussion below, the term "CPAC" can be used to refer to conditional PSCell addition or change without SN change. The term "CSAC" can be used to refer to conditional SN addition or change.

To determine the conditional procedure, the UE in some cases can determine whether the procedure relates to an MN or an SN (the single base station in single connectivity scenarios can be considered to operate as an MN). To this end, the UE can determine for example over which SRB the RAN provided the configuration information: if the UE receives the configuration information over an SRB1, the UE can determine that this information relates to an MN, and if the UE receives the configuration information over an SRB3, the UE can determine that this information relates to an SN. A conditional configuration related to an MN can pertain to a conditional handover, and conditional configuration related to an SN can pertain to a conditional SN addition/change or conditional PSCell addition/change.

Additionally or alternatively, the UE can use the current type of connectivity (SC, NE-DC, EN-DC, etc.) to determine to which conditional procedure the conditional configuration pertains. For example, when the UE receives a conditional configuration in a EUTRA RRC message and the UE operates in SC, the UE can determine that the conditional configuration relates to the MN. However, when the UE receives a conditional configuration in a EUTRA RRC message and the UE operates in NE-DC, the UE can determine that the conditional configuration relates to the SN (because information relates to the MN would have arrived via an NR message). More generally, the UE can use various types of RRC messages to determine to which conditional procedure the conditional configuration pertains. For example, when the UE receives a conditional configuration in a MN RRC message (i.e., an RRC message generated by the MN), the UE can determine that the conditional configuration relates to the MN. However, when the UE receives a conditional configuration in a SN RRC message (i.e., an RRC message generated by the SN), the UE can determine that the conditional configuration relates to the SN.

Further, the UE can rely on an information element (IE), a field, or a particular value that includes or references the conditional configuration to determine the conditional procedure. For example, a base station can use a first field (or value) to indicate that the conditional procedure is conditional handover, a second field (or value) to indicate that the conditional procedure is conditional SN addition/change, and third field (or value) to indicate that the conditional procedure is conditional PSCell addition/change. In the discussion below, the IE and field can be used interchangeably.

Still further, the UE can use an indication of the radio access technology (RAT) via which the UE received conditional configuration to determine the conditional procedure. For example, when the UE receives conditional configuration via a less advanced RAT (e.g., EUTRA) while operating in SC or certain types of DC, the UE can determine that the conditional configuration must relate to the MN.

In general, the UE can rely on any suitable combination of the techniques above to determine whether conditional configuration relates to the MN or SN, and whether the procedure is conditional handover, conditional SN addition/change, conditional PSCell addition/change, or some other conditional procedure.

FIG. 1A depicts an example wireless communication system 100 in which a UE and/or a base station can implement the techniques of this disclosure to identify and carry out conditional procedures.

The wireless communication system 100 includes a UE 102 as well as base stations 104A, 104B, 106A, 106B operating in a RAN 107 that are connected to a core network (CN) 110. The base stations 104A, 106A, 106B can be any suitable type, or types, of base stations, such as an evolved node B (eNB), a next-generation eNB (ng-eNB), or a 5G Node B (gNB), for example. As a more specific example, the base station 104A may be an eNB or a gNB, and the base station 106A and 106B may be gNBs.

The base station 104A supports a cell 124A, the base station 104B supports a cell 124B, the base station 106A supports a cell 126A, and the base station 106B supports a cell 126B. The base station 104B also supports one or more cells, which are not shown in FIG. 1 to avoid clutter. The cell 124A partially overlaps with both of cells 126A and 126B, so that the UE 102 can be in range to communicate with the base station 106A while simultaneously being in range to communicate with the base station 106A or 106B (or in range to detect or measure the signal from both base stations 104A and 106A, etc.). The overlap may make it possible for the UE 102 to hand over between cells (e.g., from cell 124A to cell 126A or 126B, or from cell 124A to the cell of the base station 104B) before the UE 102 experiences radio link failure, for example. Moreover, the overlap allows the various DC scenarios discussed below. For example, the UE 102 can communicate in DC with the base station 104A (operating as an MN) and the base station 106A (operating as an SN) and, upon completing an SN change, can communicate with the base station 104A (operating as an MN) and the base station 106B (operating as an SN). More particularly, when the UE 102 is in DC with the base station 104A and the base station 106A, the base station 104A operates as an MeNB, an Mng-eNB or an MgNB, and the base station 106A operates as an SgNB or an Sng-eNB.

In implementations and scenarios where the UE 102 is in SC with the base station 104A but is capable of operating in DC, the base station 104A operates as an MeNB, an Mng-eNB or an MgNB, and the base station 106A operates as a candidate SgNB (C-SgNB) or a candidate Sng-eNB (C-Sng-eNB).

In the scenarios where the UE 102 hands over from the base station 104A to the base station 104B, the base stations 104A and 104B operate as the source base station (S-BS) and a target base station (T-BS), respectively. The UE 102 can operate in DC with the base station 104A and a base station 106A for example prior to the handover, and continue to operate in DC with the base station 104A and the base station 106A after completing the handover. The base stations 104A and 104B in this case operate as a source MN (S-MN) and a target MN (T-MN), respectively, provided the handover is immediate. When the handover is conditional, the base station operates as a conditional T-MN (C-T-MN) or simply C-MN.

Although various scenarios are described below in which the base station 104A operates as an MN and the base station 106A (or 106B) operates as an SN or C-SN, any of the base stations 104A, 104B, 106A, 106B generally can operate as an MN, an SN or a C-SN in different scenarios. Thus, in some implementations, the base station 104A, the base station 104B, the base station 106A, and the base station 106B can implement similar sets of functions and each support MN, SN and C-SN operations.

In operation, the UE 102 can use a radio bearer (e.g., a DRB or an SRB) that at different times terminates at an MN (e.g., the base station 104A) or an SN (e.g., the base station 106A). The UE 102 can apply one or more security keys when communicating on the radio bearer, in the uplink (from the UE 102 to a base station) and/or downlink (from a base station to the UE 102) direction.

The base station 104A includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1 includes a conditional configuration controller 132 that is configured to manage or control the conditional configuration techniques of this disclosure. For example, the conditional configuration controller 132 may be configured to support RRC messaging associated with immediate and conditional handover procedures, and/or to support the necessary operations when the base station 104A operates as an MN relative to an SN. Moreover, in some implementations and/or scenarios, the conditional configuration controller 132 may be responsible for maintaining (for the UE 102 and a number of other UEs not shown in FIG. 1) current sets of conditional configurations in accordance with various implementations discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1 includes a conditional configuration controller 142 that is configured to manage or control RRC procedures and RRC configurations. For example, the conditional configuration controller 142 may be configured to support RRC messaging associated with immediate and conditional handover procedures, and/or to support the necessary operations when the base station 106A operates as an SN or candidate SN (C-SN). Moreover, in some implementations and/or scenarios, the conditional configuration controller 142 may be responsible for maintaining (for the UE 102 and a number of other UEs not shown in FIG. 1) current sets of conditional configurations in accordance with various implementations discussed below. While not shown in FIG. 1, the base station 106B may include processing hardware similar to the processing hardware 140 of the base station 106A.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1 includes a conditional configuration controller 152 that is configured to manage or control RRC procedures and RRC configurations related to conditional configurations. For example, the conditional configuration controller 152 may be configured to support RRC messaging associated with immediate and conditional handover and/or secondary node addition/modification procedures, and may also be responsible for maintaining a current set of conditional configurations for the UE 102 (e.g., adding, releasing or modifying conditional configurations as needed) in accordance with any of the implementations discussed below.

The CN 110 may be an evolved packet core (EPC) 111 or a fifth-generation core (5GC) 160, both of which are depicted in FIG. 1. The base stations 104A and 104B may be an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A may be an EN-DC gNB (en-gNB) with an S1 interface to the EPC 111, an en-gNB that does not connect to the EPC 111, a gNB that supports the NR radio interface as well as an NG interface to the 5GC 160, or an ng-eNB that supports an EUTRA radio interface as well as an NG interface to the 5GC 160. To directly exchange messages with each other during the various scenarios discussed below, the base stations 104A, 104B, 106A, 106B may support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is generally configured to manage authentication, registration, paging, and other related functions. The 5GC 160 includes a User Plane Function (UPF) 162 and an Access and Mobility Management Function (AMF) 164, and/or a Session Management Function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

Generally, the wireless communication system 100 may include any suitable number of base stations supporting NR cells and/or EUTRA cells. More particularly, the EPC 111 or the 5GC 160 can be connected to any suitable number of base stations supporting NR cells and/or EUTRA cells. For example, an additional base station is considered in immediate and conditional handover scenarios that are discussed below with reference to FIG. 1B. Although the examples below refer specifically to specific CN types (EPC, 5GC) and RAT types (5G NR and EUTRA), in general the techniques of this disclosure can also apply to other suitable radio access and/or core network technologies, such as sixth generation (6G) radio access and/or 6G core network or 5G NR-6G DC, for example.

As indicated above, the wireless communication system 100 may support various procedures (e.g., handover, SN addition, etc.) and modes of operation (e.g., SC or DC). Example operation of various procedures that may be implemented in the wireless communication system 100 will now be described.

In some implementations, the wireless communication system 100 supports immediate handovers between cells. In one scenario, for example, the UE 102 initially connects to the base station 104A, and the base station 104A later performs preparation for an immediate handover with the base station 106A via an interface (e.g., X2 or Xn). In this scenario, the base stations 104A and 106A operate as a source base station and a target base station, respectively. In the handover preparation, the source base station 104A sends a Handover Request message to the target base station 106A. In response, the target base station 106A includes an immediate handover command message in a Handover Request Acknowledge message, and sends the Handover Request Acknowledge message to the source base station 104A. The source base station 104A then transmits the handover command message to the UE 102 in response to receiving the Handover Request Acknowledge message.

Upon receiving the immediate handover command message, the UE 102 immediately reacts to the immediate handover command, by attempting to connect to the target base station 106A. To connect to the target base station 106A, the UE 102 may perform a random access procedure with the target base station 106A, and then (after gaining access to a control channel) transmit a handover complete message to the target base station 106A via a cell of the base station 106A (i.e., in response to the immediate handover command).

In some implementations, the wireless communication system 100 also supports conditional handovers. In one scenario, for example, the UE 102 initially connects to the base station 104A, and the base station 104A later performs a first conditional handover preparation procedure with the base station 106A via an interface (e.g., X2 or Xn) to prepare for a potential handover of the UE 102 to the base station 106A. In this scenario, the base stations 104A and 106A operate a source base station and a candidate base station, respectively. In the first conditional handover preparation procedure, the source base station 104A sends a Handover Request message to the candidate base station 106A. In response, the candidate base station 106A includes a first conditional handover command message in a Handover Request Acknowledge message, and sends the Handover Request Acknowledge message to the source base station 104A. The source base station 104A then transmits the first conditional handover command message to the UE 102, in response to receiving the Handover Request Acknowledge message.

Upon receiving the first conditional handover command message, the UE 102 does not immediately react to the first conditional handover command message by attempting to connect to the candidate base station 106A. Instead, the UE 102 connects to the candidate base station 106A according to the first conditional handover command message only if the UE 102 determines that a first condition is satisfied for handing over to a candidate cell 126A of the candidate base station 106A. The base station 106A provides a configuration for the candidate cell 126A (i.e., a configuration that the UE 102 can use to connect with the base station 106A via the candidate cell 126A) in the first conditional handover command message.

Before the first condition is met, the UE 102 has not yet connected to the candidate base station 106A. In other words, the candidate base station 106A has not yet connected and served the UE 102. In some implementations, the first condition can be that a signal strength/quality, as measured by the UE 102 on the candidate cell 126A of the candidate base station 106A, is "good" enough. For example, the first condition may be satisfied if one or more measurement results obtained by the UE 102 (when performing measurements on the candidate cell 126A) are above a threshold that is configured by the source base station 104A, or above a pre-determined or pre-configured threshold. If the UE 102 determines that the first condition is satisfied, the candidate base station 106A becomes the target base station 106A for the UE 102, and the UE 102 attempts to connect to the target base station 106A. To connect to the target base station 106A, the UE 102 may perform a random access procedure with the target base station 106A, and then (after gaining access to a control channel) transmit a first handover complete message via the candidate cell 126A to the target base station 106A. After the UE 102 successfully completes the random access procedure and/or transmits the first handover complete message, the target base station 106A becomes the source base station 106A for the UE 102, and the UE 102 starts communicating data with the source base station 106A.

In some implementations and/or scenarios, conditional handovers can occur with more than one candidate cell supported by the candidate base station 106A (e.g., cell 126A and another cell of base station 106A not shown in FIG. 1). In one such scenario, the base station 106A may provide a configuration of an additional candidate cell of the base station 106A, in addition to a configuration of the candidate cell 126A, in the first conditional handover command message. The UE 102 may then monitor whether a second condition is met for the additional candidate cell of the candidate base station 106A, while also monitoring whether the first condition is met for the candidate cell 126A. The second condition can be the same as or different from the first condition.

In another scenario, the base station 104A also performs a second conditional handover preparation procedure with the base station 106A via the interface (e.g., X2 or Xn), to prepare a potential handover of the UE 102 to the base station 106A, in a procedure similar to that described above. In this scenario, however, the base station 104A also transmits to the UE 102 a second conditional handover command message that the base station 104A received from the candidate base station 106A, for the potential handover in the second conditional handover preparation. The base station 106A may provide a configuration of an additional candidate cell (not shown in FIG. 1) in the second handover command message. The UE 102 may monitor whether a second condition is met for the additional candidate cell of the candidate base station 106A. The second condition can be the same as or different from the first condition.

The base station 104A may also perform a third conditional handover preparation procedure with the base station 106B via an interface (e.g., X2 or Xn), to prepare a potential handover of the UE 102 to the base station 106B, in a procedure similar to that described above. In this scenario, the base station 104A transmits to the UE 102 a third conditional handover command message, which the base station 104A received from the candidate base station 106B for the potential handover in the third conditional handover preparation. The base station 106A may provide a configuration of a candidate cell 126B in the third handover command message. The UE 102 may monitor whether a third condition is met for the candidate cell 126B of the candidate base station 106B. The third condition can be the same as or different from the first and/or second conditions. The conditional handover command messages above can be RRC reconfiguration messages, or may be replaced by conditional handover configurations that are information elements (IEs).

In some implementations, the wireless communication system 100 supports DC operation, including SN addition and SN change procedures. In one scenario, for example, after the UE 102 connects to the base station 104A, the base station 104A can perform an immediate SN addition procedure to add the base station 106A as a secondary node, thereby configuring the UE 102 to operate in DC with the base stations 104A and 106A. At this point, the base stations 104A and 106A operate as an MN and an SN, respectively. Later, while the UE 102 is still in DC with the MN 104A and the SN 106A, the MN 104A may perform an immediate SN change procedure to change the SN of the UE 102 from the base station 106A (which may be referred to as the source SN or S-SN) to the base station 106B (which may be referred to as the target SN or T-SN).

In other scenarios, the base station 104A may perform a conditional SN addition procedure to configure the base station 106A as a candidate SN (C-SN) for the UE 102, while the UE 102 is in single connectivity (SC) with the base station 104A, or while the UE 102 is in DC with the base stations 104A and 106B, and before the UE 102 has connected to the C-SN 106A. In this case, the base stations 104A and 106A operate as an MN and a C-SN, respectively, for the UE 102. When the UE 102 receives the configuration for the C-SN 106A, the UE 102 does not connect to the C-SN 106A unless and until the UE 102 detects that the corresponding condition is satisfied. If the UE 102 determines that the condition is satisfied, the UE 102 connects to the C-SN 106A, such that the C-SN 106A becomes the SN 106A for the UE 102.

In some implementations, the condition can be that a signal strength/quality, as measured by the UE 102 on a candidate primary secondary cell (C-PSCell) of the C-SN 106A, is "good" enough. For example, the condition may be satisfied if one or more measurement results obtained by the UE 102 (when performing measurements on the C-PSCell) are above a threshold that is configured by the MN 104A, or above a pre-determined or pre-configured threshold. If the UE 102 determines that condition is satisfied, the UE 102 may perform a random access procedure with the C-SN 106A to connect to the C-SN 106A. Once the UE 102 successfully completes the random access procedure, the base station 106A becomes an SN for the UE 102, and the C-PSCell (e.g., cell 126A) becomes a PSCell for the UE 102. The SN 106A may then start communicating data with the UE 102.

Yet another scenario relates to a conditional PSCell change. In this scenario, the UE 102 is initially in DC with the MN 104A (via a primary cell (PCell)) and the SN 106A (via a PSCell, not shown in FIG. 1, that is different than cell 126A). The SN 106A can provide a configuration for the C-PSCell 126A, for the UE 102. If the UE 102 is configured with a signaling radio bearer (SRB) that permits the exchange of RRC messages with the SN 106A (e.g., SRB3), the SN 106A may transmit the configuration for the C-PSCell 126A to the UE 102 directly via the SRB, or via the MN 104A. In some implementations, the SN 106A may transmit an RRC reconfiguration message including the configuration via the SRB to the UE 102. If the UE 102 does not have an SRB or the SN 106A determines to transmit the configuration via the MN 104A, the SN 106A may transmit the configuration for the C-PSCell 126A to the UE 102 via the MN 104A. In some implementations, the SN 106A may send the RRC reconfiguration message to the MN 104A and, in turn, the MN 104A transmits the RRC reconfiguration message to the UE 102. The SN 106A may transmit the configuration in response to one or more measurement results received from the UE 102 via the SRB, or in response to one or more measurement results obtained by the SN 106A from measurements on signals received from the UE 102, for example.

In contrast to the immediate PSCell change case discussed above, the UE 102 does not immediately disconnect from the PSCell and attempt to connect to the C-PSCell 126A after receiving the configuration for the C-PSCell 126A. Instead, the UE 102 does not connect to the C-PSCell 126A until the UE 102 determines that a certain condition is satisfied. When the UE 102 determines that the condition has been satisfied, the UE 102 connects to the C-PSCell 126A, such that the C-PSCell 126A begins to operate as the PSCell 126A for the UE 102. In some implementations, the UE 102 disconnects from the PSCell in order to connect to the C-PSCell 126A.

In some scenarios, the condition associated with conditional SN addition or conditional PSCell change can be that signal strength/quality, as measured by the UE 102 on a C-PSCell of the C-SN 106A, exceeds a certain threshold or otherwise corresponds to an acceptable measurement. For example, when the one or more measurement results that the UE 102 obtains on the C-PSCell 126A are above a threshold configured by the MN 104A or the C-SN 106A, or above a pre-determined or pre-configured threshold, the UE 102 may determine that the condition is satisfied. When the UE 102 determines that such a condition is satisfied, the UE 102 can perform a random access procedure on the C-PSCell 126A and with the C-SN 106A to connect to the C-SN 106A. Once the UE 102 successfully completes the random access procedure on the C-PSCell 126A, the C-PSCell 126A becomes a PSCell 126A for the UE 102. The C-SN 106A can then start communicating data (user-plane data and/or control-plane data) with the UE 102 through the PSCell 126A.

In different configurations or scenarios of the wireless communication system 100, the base station 104A may operate as a master eNB (MeNB) or a master gNB (MgNB), and the base station 106A or 106B can be implemented as a secondary gNB (SgNB) or a candidate SgNB (C-SgNB).

The UE 102 may communicate with the base station 104A and the base station 106A or 106B via the same radio access technology (RAT), such as EUTRA or NR, or via different RATs. If the base station 104A is an MeNB and the base station 106A is an SgNB, the UE 102 may be in EUTRA-NR DC (EN-DC) with the MeNB and the SgNB. In this scenario, the MeNB 104A may or may not configure the base station 106B as a C-SgNB to the UE 102. When the base station 104A is an MeNB and the base station 106A is a C-SgNB for the UE 102, the UE 102 may be in SC with the MeNB. In this scenario, the MeNB 104A may or may not configure the base station 106B as another C-SgNB to the UE 102.

In some cases, an MeNB, an SeNB or a C-SgNB may be implemented as an ng-eNB rather than an eNB. When the base station 104A is a master ng-eNB (Mng-eNB) and the base station 106A is a SgNB, the UE 102 may be in next generation (NG) EUTRA-NR DC (NGEN-DC) with the Mng-eNB and the SgNB. In this scenario, the MeNB 104A may or may not configure the base station 106B as a C-SgNB to the UE 102. When the base station 104A is an Mng-NB and the base station 106A is a C-SgNB for the UE 102, the UE 102 may be in SC with the Mng-NB. In this scenario, the Mng-eNB 104A may or may not configure the base station 106B as another C-SgNB to the UE 102.

When the base station 104A is an MgNB and the base station 106A is an SgNB, the UE 102 may be in NR-NR DC (NR-DC) with the MgNB and the SgNB. In this scenario, the MeNB 104A may or may not configure the base station 106B as a C-SgNB to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A is a secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

Figure 1B:
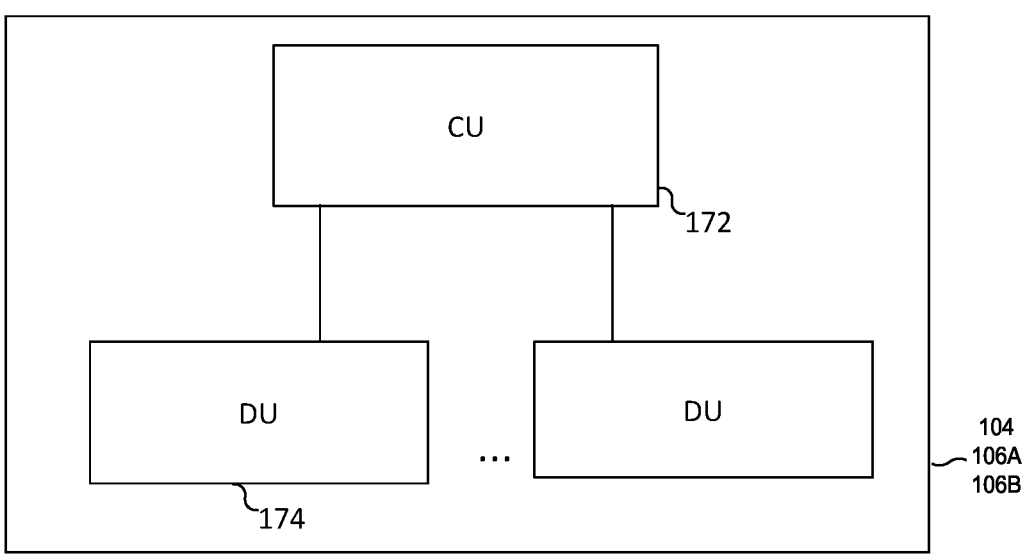
FIG. 1B is a block diagram of an example base station in which a centralized unit (CU) and distributed units (DUs) can operate in the system of FIG. 1A or FIG. 1B.

FIG. 1B depicts an example distributed implementation of a base station such as the base station 104, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as a MN, an SN or a candidate SN (C-SN). The process hardware may include further a physical layer controller configured to manage or control one or more physical layer operations or procedures.

Figure 2:
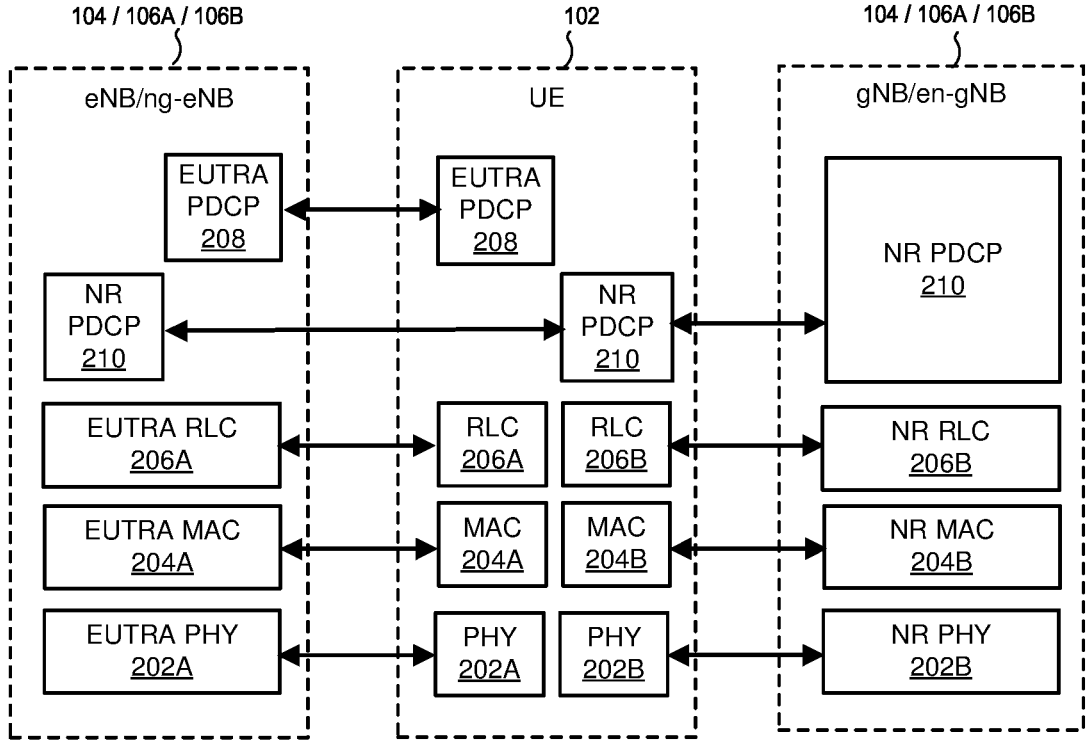
FIG. 2 is a block diagram of an example protocol stack according to which the UE of FIG. 1A communicates with the base stations of FIG. 1A.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the BS 104A operating as a MeNB and the BS 106A operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Next, several example scenarios in which a base station initiates a conditional PSCell addition or change procedure are discussed with reference to FIGS. 3-5, followed by a discussion of example scenarios in which a base station initiates a conditional handover procedure, with reference to FIGS. 6-7.

Figure 3:
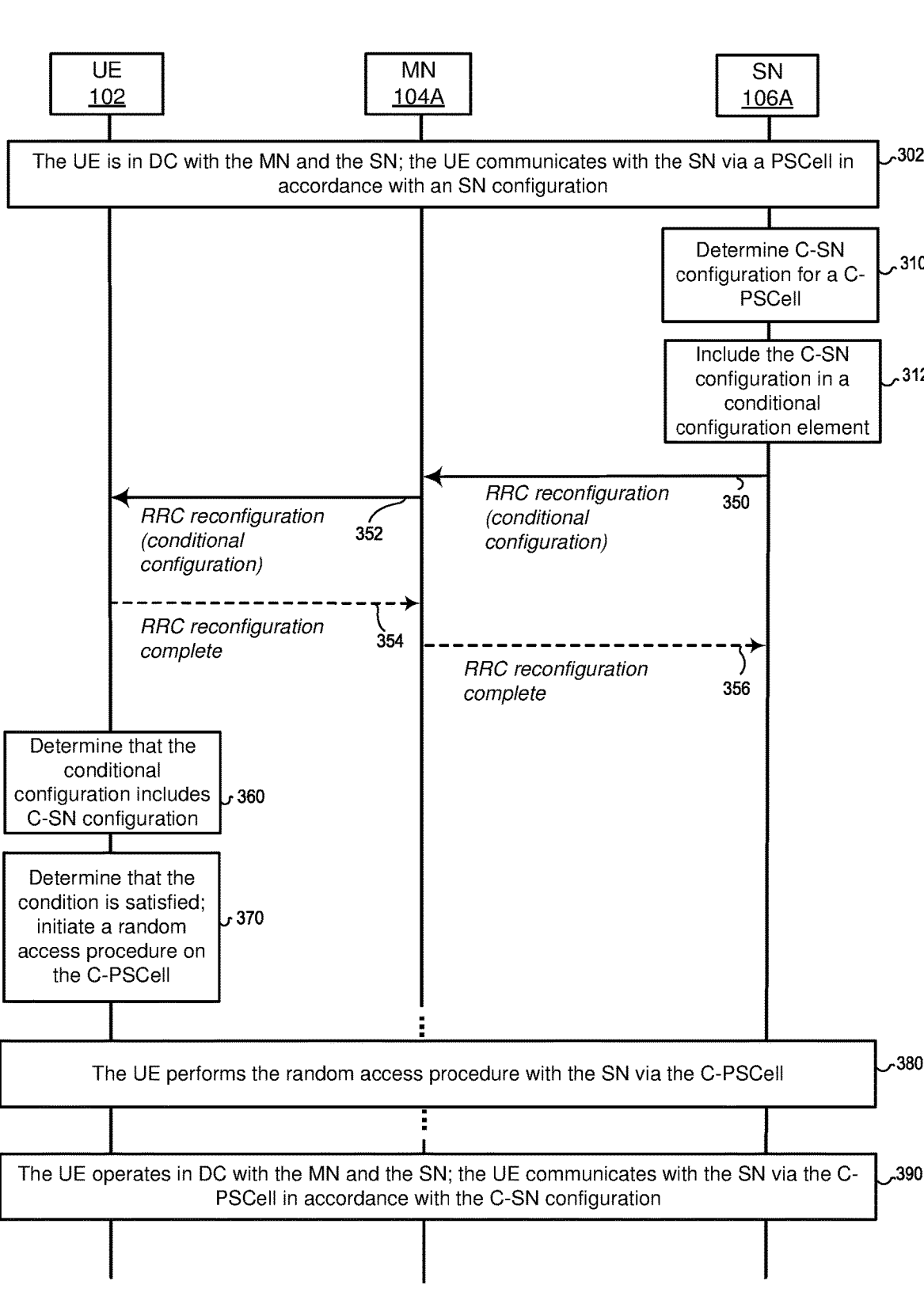
FIG. 3 is a messaging diagram of an example scenario in which the SN of FIG. 1A initiates a conditional PSCell addition or change procedure, via the MN of FIG. 1A or 1B, in accordance with the techniques of this disclosure.

Referring first to FIG. 3, the base station 104A in a scenario 300 operates as an MN, and the base station 106A operates as a SN. Initially, the UE 102 operates 302 in DC with the MN 104A and the SN 106A. The UE 102 can exchange 302 UL Data PDUs and/or DL Data PDUs with SN 106A via a certain PSCell (a suitable cell other than the cell 126A that operates as a C-PSCell as discussed below), in accordance with the current SN configuration.

The SN 106A at some point determines 310 that it should generate a full C-SN configuration for the UE 102, configuring a C-PSCell 126A. The SN 106A can make this determination based on one or more measurement results received from the UE 102 via the MN 104A, from the UE directly (e.g., via a signaling radio bearer (SRB) established between the UE 102 and the SN 106A or via a physical control channel), or obtained by the SN 106A from measurements on signals, control channels or data channels received from the UE 102, for example, or another suitable event. In response to this determination, the SN 106A can include 312 the C-SN configuration in a conditional configuration element, which can be an information element (IE), a field, or another suitable element. The SN 106A the can include the conditional configuration in suitable message such as an RRC reconfiguration message and transmit 350 the message to the MN 104A. The MN 104A in turn can transmit 352 the RRC reconfiguration message with the conditional configuration to the UE 102. In some implementations, the UE 102 can transmit 354 an RRC reconfiguration complete message to the MN 104A in response to the RRC reconfiguration message. The MN 104A can transmit 356 an SN Reconfiguration Complete message to the SN 106A.

To transmit 352 the RRC reconfiguration message, the MN 104A in one implementation transmits, to the UE 102, an RRC container message including the RRC reconfiguration message. Further, to transmit 354 the RRC reconfiguration complete message to the MN 104A, the UE 102 in one implementation transmits an RRC container response message including the RRC reconfiguration complete message. To forward the SN Reconfiguration Complete message to the SN 106A, the MN 104A can include 356 the RRC reconfiguration complete message in the SN Reconfiguration Complete message.

Using the techniques discussed in more detail below, the UE 102 then can determine 360 that the conditional configuration includes a C-SN configuration (in this case, the C-SN configuration transmitted 350 by the SN 106A), so that the UE 102 may apply the C-SN configuration to communicate with the SN 106A as described for events 380 and 390.

When the UE 102 detects 370 that a condition (or conditions) for connecting to the C-PSCell 126A is satisfied, the UE 102 initiates a random access procedure on the C-PSCell 126A. For convenience, the discussion below refers to the condition or a configuration in singular, but it will be understood that it can be one or multiple conditions or include one or multiple configuration parameters. The UE 102 performs 380 the random access procedure with the SN 106A via the C-PSCell 126A using one or more random access configurations included in the C-SN configuration. The one or more random access configurations are configuration(s) for the UE 102 to perform the random access procedure. The UE 102 may disconnect from the PSCell (the former cell via which the UE 102 communicated 302 with the SN 106A) upon detecting 370 that the condition has been satisfied, upon initiating 370 the random access procedure, or at another suitable time.

The random access procedure can be a four-step random access procedure or a two-step random access procedure, for example. In different implementations or scenarios, the random access procedure is a contention-based random access procedure or a contention-free random access procedure. After the UE 102 successfully completes 380 the random access procedure, the UE 102 continues to operate in DC with the MN 104A and the SN 106A, but the UE 102 now communicates 390 with the SN 106A via the C-PSCell 126A, which is a new PSCell 126A. The UE 102 communicates in accordance with the C-SN configuration.

In some implementations, the SN 106A identifies the UE 102 by retrieving the identity of the UE 102 from a medium access control (MAC) protocol data unit (PDU), which the UE 102 transmits 380 during the random access procedure. The SN 106A can include the identity of the UE 102 in the C-SN configuration. In other implementations, the SN 106A identifies the UE 102 when the SN 106A receives a dedicated random access preamble from the UE 102 when performing 380 the random access procedure. The SN 106A can include the dedicated random access preamble in the C-SN configuration.

In some implementations, the C-SN configuration is a complete and self-contained configuration, or so-called full configuration. The C-SN configuration can include a full configuration indication (an IE or a field) indicating the C-SN configuration is a full configuration. The UE 102 can directly use the C-SN configuration to communicate with the SN 106A without referring to the previously provided SN configuration. In other implementations, the C-SN configuration can be a delta configuration and include one or more configuration parameters in addition to a previously provided SN configuration. The UE 102 can use the C-SN configuration together with the previously provided SN configuration to communicate with the SN 106A.

The C-SN configuration can include multiple configuration parameters for the UE 102 to communicate with the SN 106A via the C-PSCell 126A. The multiple configuration parameters can configure radio resources for the UE 102 to communicate with the SN 106A via the C-PSCell 126A and zero, one, or more candidate secondary cells (C-SCells) of the SN 106A. The multiple configuration parameters may configure zero, one, or more radio bearers. The one or more radio bearers can include an SRB and/or one or more DRBs.

The SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or DRB(s).

In some implementations, the SN 106A includes the RRC reconfiguration message in an SN Modification Acknowledge message responsive to an SN Modification Request message from the MN 104 (not shown), and sends the SN Modification Request Acknowledge message to the MN 104A at event 350. In other implementations, the SN 106A can include the RRC reconfiguration message in an SN Modification Required message and send the SN Modification Required message to the MN 104A at event 350. In some implementations, the SN 106A indicates that the SN Modification Request Acknowledge message or the SN Modification Required message is for conditional PSCell addition or change (CPAC), so that the MN 104A can determine that the SN Modification Request Acknowledge message or the SN Modification Required message includes a conditional configuration for the CPAC. In other implementations, the SN 106A does not indicate CPAC in the SN Modification Request Acknowledge message or the SN Modification Required message, so that the CPAC configuration from the SN 106A is transparent to the MN 104A.

In some implementations, the SN 106A includes an indication of the condition which UE 102 detects 370 in the conditional configuration element (see event 312). In another implementation, the SN 106A includes an indication of this condition in the C-SN configuration. In yet another implementation, the SN 106A includes the C-SN configuration and an indication of the condition configuration directly in the RRC reconfiguration message (event 350).

If the SN 106A is implemented as a next generation eNB (ng-eNB), the RRC reconfiguration message (events 350, 352) is an RRCConnectionReconfiguration message, and the RRC reconfiguration complete message (event 354) is an RRCConnectionReconfigurationComplete message. If the SN 106A is implemented as a gNB, the RRC reconfiguration message (events 350, 352) can be implemented as an RRCReconfiguration message, and the RRC reconfiguration complete message (event 354) can be implemented as an RRCReconfigurationComplete message.

In some implementations, the C-SN configuration includes a group configuration (CellGroupConfig) IE that configures the C-PSCell 126A as well as zero, one, or more C-SCells of the SN 106A. In one implementation, the C-SN configuration is an RRCReconfiguration message, with RRCReconfiguration IEs or CellGroupConfig IEs conforming to 3GPP TS 38.331. The full configuration indication may be a field or an IE conforming to 3GPP TS 38.331. In other implementations, the C-SN configuration can include an SCG-ConfigPartSCG-r12 IE that configures the C-PSCell 126A and zero, one, or more C-SCells of the SN 106A. In one implementation, the C-SN configuration is an RRCConnectionReconfiguration message, with RRCConnectionReconfiguration IEs or ConfigPartSCG-r12 IEs conforming to 3GPP TS 36.331. The full configuration indication can be a field or an IE conforming to 3GPP TS 36.331.

In some implementations, the SN configuration includes a CellGroupConfig IE that configures the PSCell and zero, one, or more SCells of the SN 106A. In one implementation, the SN configuration is an RRCReconfiguration message, RRCReconfiguration-IEs or the CellGroupConfig IE conforming to 3GPP TS 38.331. In other implementations, the SN configuration can include a SCG-ConfigPartSCG-r12 IE that configures the PSCell and zero, one, or more SCells of the SN 106A. In one implementation, the SN configuration is an RRCConnectionReconfiguration message, RRCConnectionReconfiguration IEs or the ConfigPartSCG-r12 IE conforming to 3GPP TS 36.331.

In some cases, the UE 102 receives one or more conditions (discussed below in singular for convenience) in the RRC reconfiguration message, the conditional configuration or the C-SN configuration at event 352. In other words, the SN 106A may include the one or more conditions in the RRC reconfiguration message, the conditional configuration or the C-SN configuration at event 350. The UE 102 can use the one or more conditions to determine whether to connect to the C-PSCell 126A. If the UE 102 determines that the condition is satisfied, the UE 102 connects to the C-PSCell 126A. That is, the condition (or called triggering condition) triggers the UE 102 to connect to the C-PSCell 126A or to execute the C-SN configuration. If the UE 102 does not determine that the condition is satisfied, the UE 102 does not connect to the C-PSCell 126A.

In some implementations, the SN 106A includes a CU 172 and one or more DU 174 as shown in FIG. 1B. The DU 174 can generate the C-SN configuration or part of the C-SN configuration and send the C-SN configuration or part of the C-SN configuration to the CU 172. In case the DU 174 generates part of the C-SN configuration, the CU 172 can generate rest of the C-SN configuration. In one implementation, the DU 174 can perform the random access procedure 316 with the UE 102 and identify the UE 102 in the random access procedure. In response to the identification, the DU 174 communicates with the UE 102 using the C-SN configuration or part of the C-SN configuration. In another implementation, the DU 174 can perform the random access procedure 316 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the rest of the C-SN configuration and part of the C-SN configuration respectively.

If the SN 106A identifies the UE 102 on the C-PSCell 126A at event 380, the SN 106A begins to transmit downlink control information (DCI) command(s) on physical downlink control channel(s) (PDCCH(s)), reference signal(s) or data to the UE 102 via the C-PSCell 126A and/or one or more C-SCells (if configured in the C-SN configuration) according to certain configuration parameters in the C-SN configuration. If the SN 106A identifies the UE 102 on the C-PSCell 126A at event 380, the SN 106A may receive signal(s) on physical uplink control channel(s) (PUCCH(s)), sounding reference signal(s) or data from the UE 102 via the C-PSCell 126A and/or one or more C-SCells (if configured in the C-SN configuration) according to some configuration parameters in the C-SN configuration. The UE 102 receives the DCI command(s) on PDCCH(s), reference signal(s) or data from the SN 106A via the C-PSCell 126A and/or one or more C-SCells (if configured in the C-SN configuration) according to certain configuration parameters in the C-SN configuration. The UE 102 may transmit signal(s) on PUCCH(s), sounding reference signal(s) or data to the SN 106A via the C-PSCell 126A and one or more C-SCells (if configured in the C-SN configuration) according to certain configuration parameters in the C-SN configuration. In response to the identification, the SN 106A determines that the C-PSCell 126A becomes PSCell 126A and the one or more C-SCells becomes one or more SCells.

As described above, when the SN 106A configures the C-PSCell 126A to the UE 102 at events 350 and 352 in advance, the SN 106A does so in advance, before the C-PSCell 126A becomes suitable for the UE 102. When the C-PSCell 126A becomes suitable for the UE 102 (i.e., the UE 102 determines that the corresponding condition is satisfied), the UE 102 performs 380 the random access procedure with the C-PSCell 126A to change the PSCell relatively quickly. In contrast to the immediate PSCell change procedure, the conditional PSCell change technique discussed in this disclosure can significantly reduce latency associated with DC configuration.

If the MN 104A is implemented as a gNB, the RRC container message can be an RRCReconfiguration message and the RRC container response message can be an RRCReconfigurationComplete message, in some implementations. If the MN 104A is implemented as an eNB or ng-eNB, the RRC container message can be an RRCConnectionReconfiguration message, and the RRC container response message can be an RRCConnectionReconfigurationComplete message. In yet other implementations, the RRC container message can be a DLInformationTransfer message or a DLInformationTransferMRDC message. In some implementations, the UE 102 sets a transaction identifier to a value of a transaction identifier in the RRC container message and includes the transaction identifier in the RRC container response message. The MN 104A can correlate the RRC container response message to the RRC container message according to the value of the transaction identifier.

Figure 4:
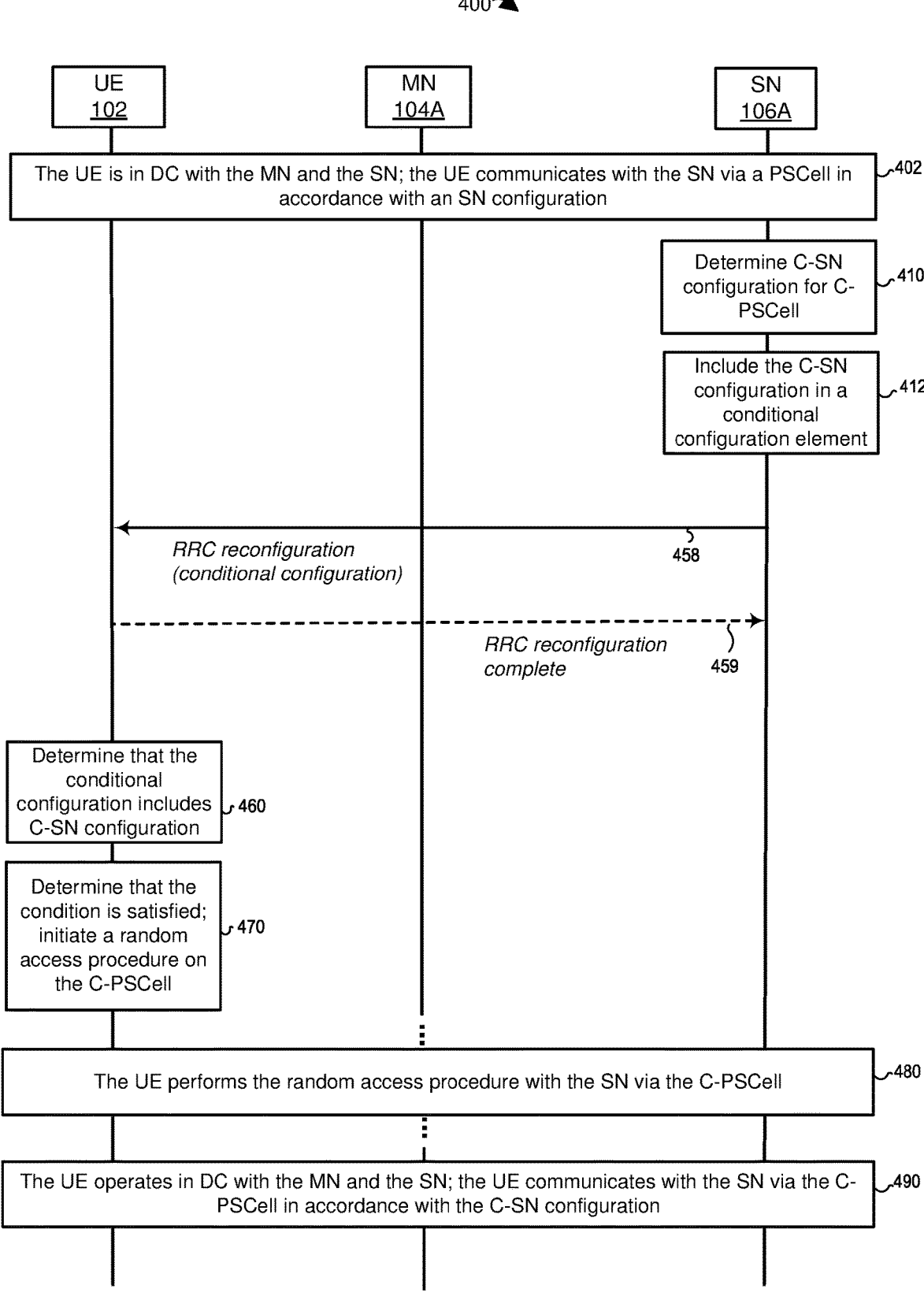
FIG. 4 is a messaging diagram of an example scenario in which the SN of FIG. 1A initiates a conditional PSCell addition or change procedure in accordance with the techniques of this disclosure.

Now turning to FIG. 4, a scenario 400 also involves a conditional C-PSCell change without SN change, i.e., a conditional change of a PSCell of an SN when the UE is already in DC with the MN and SN. In this scenario, the base station 104A operates as a MN, and the base station 106A operates as an SN. Events 402, 410, 412, 460, 470, 480, and 490 in this scenario are similar to events 302, 310, 312, 360, 370, 380, and 390 discussed with reference to FIG. 3. The differences between the scenarios of FIG. 3 and FIG. 4 are discussed below.

In the scenario 400, the SN 106A directly transmits 458 the RRC reconfiguration message including the conditional configuration to the UE 102, instead of sending the RRC reconfiguration message to the UE 102 via the MN 104A. In some implementations, the SN 106A configures a first SRB to the UE 102 via the MN 104A and transmits the RRC reconfiguration message via the first SRB to the UE 102. For example, the SN 106A can send an SRB configuration configuring the first SRB (e.g., SRB3) to the MN 104A, and the MN 104A transmits the SRB configuration to the UE 102 via a second SRB (e.g., SRB1) set up between the MN 104A and the UE 102. In some implementations, the UE 102 transmits an RRC reconfiguration complete message via the first SRB to the SN 106A in response to the RRC reconfiguration message.

Figure 5:
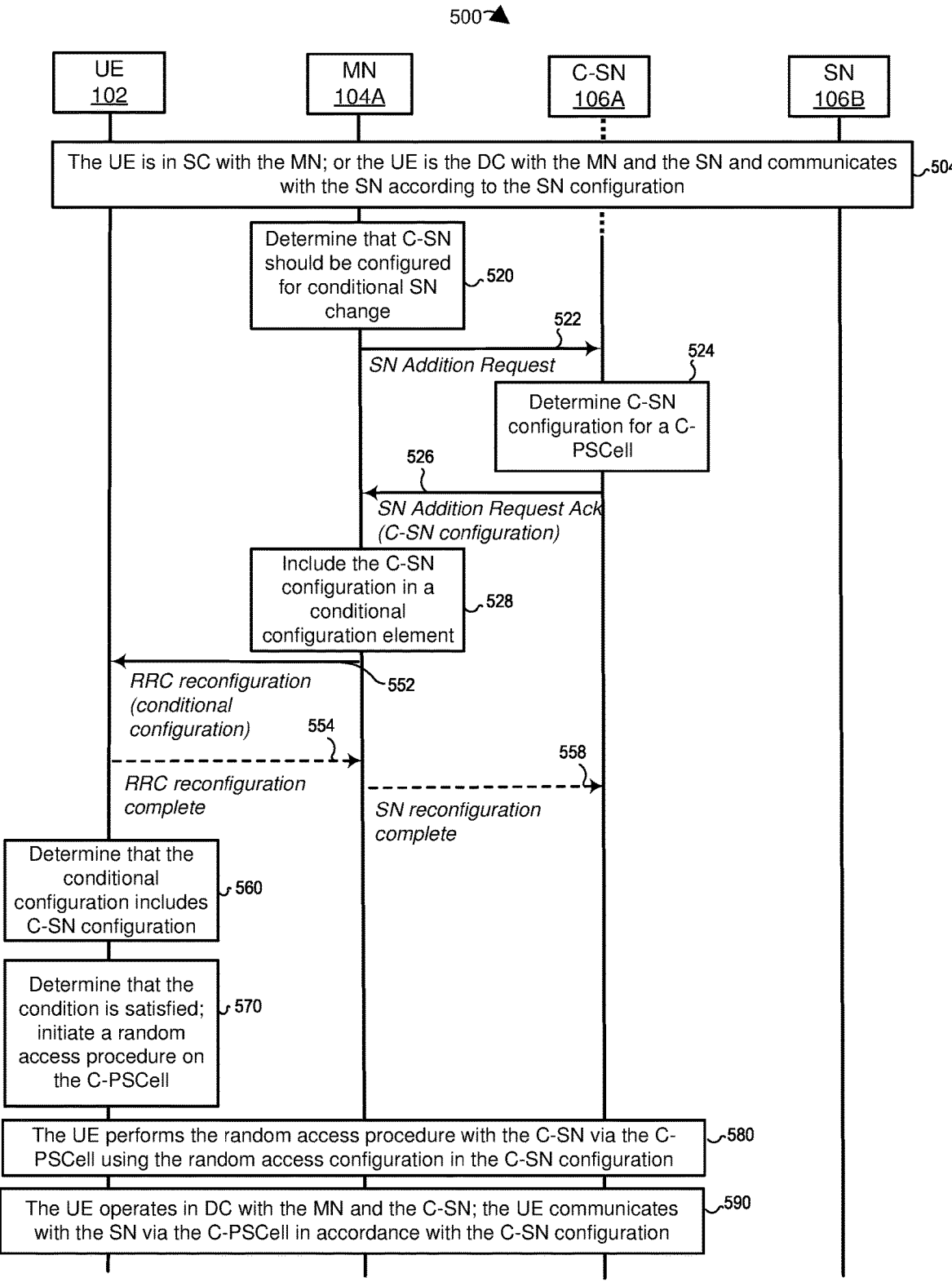
FIG. 5 is a messaging diagram of an example scenario in which the MN of FIG. 1A initiates a conditional SN addition or change procedure in accordance with the techniques of this disclosure.

Next, FIG. 5 illustrates a scenario 500 that involves a conditional SN addition or change (CSAC). In this scenario, the base station 104A operates as a MN, the base station 106A operates as a C-SN, and the base station 106B operates as an SN. Several events in the scenario 500 are similar to events in the scenarios 300. The differences between the scenarios of FIG. 3 and FIG. 5 are discussed below.

In the beginning of the scenario 500, the UE 102 can operate 504 in single connectivity (SC) with the MN 104A and exchange UL Data PDUs and/or DL Data PDUs with MN 104A via a PCell. Alternatively, the UE 102 can operate 504 in DC with the MN 104A and the SN 106A, and exchange UL Data PDUs and/or DL Data PDUs with SN 106A via a PSCell (which can be a suitable cell other than cell 126A), in accordance with a certain SN configuration.

The MN 104A can determine 520 that it should configure the base station 106A as a C-SN for the purposes of a CSAC procedure, so that the UE 102 can start using the SN 106A instead of the SN 106B when the UE detects that articulated conditions are satisfied. The MN 104A can determine to do so based on measurement result(s) from the UE 102 or in response to a message indicating that a conditional SN change is required (e.g., an SN Change Required message). In response to this determination, the MN 104A can send 522 an SN Request message to the C-SN 106A for the CSAC. In some implementations, the MN 104A can indicate to the base station 106A in the SN Request message that the base station 106A is requested to be a C-SN for the UE 102. In response to the SN Request message, the C-SN 106A can determine 524 that it should generate a C-SN configuration for the CSAC.

The C-SN 106A can transmit 526 the SN Request Acknowledge message to the MN 104A in response to the SN Addition Request message. The C-SN configuration can configure a C-PSCell and also may configure zero, one, or more C-SCells. The MN 104A then can include 528 the C-SN configuration in a conditional configuration and transmits 552 an RRC container message including the conditional configuration to the UE 102. In some implementations, the UE 102 may transmit 554 an RRC container response message to the MN 104A in response to the RRC reconfiguration message. The MN 104A can send 558 an SN Reconfiguration Complete message to the C-SN 106A in response to receiving 554 the RRC reconfiguration complete message. In some implementations, the SN Request message can be an SN Addition Request and the SN Request Acknowledge message can be an SN Addition Request Acknowledge message. In other implementations, the SN Request message can be an SN Modification Request, and the SN Request Acknowledge message can be an SN Modification Request Acknowledge message.

The UE 102 determines 560 that the conditional configuration includes the C-SN configuration, so that the UE 102 can apply the C-SN configuration to communicate with the C-SN 106A (see events 580 and 590).

The UE 102 determines 570 a condition (or conditions) for connecting to the C-PSCell 126A is satisfied and initiates 570 a random access procedure on the C-PSCell 126A in response to the detection. For convenience, the discussion below refers to the condition or a configuration in singular, but it will be understood that it can be one or multiple conditions or include one or multiple configuration parameters. In response to the initiation, the UE 102 performs 580 the random access procedure with the C-SN 106A via the C-PSCell 126A using a random access configuration in the C-SN configuration. The UE 102 (if the UE 102 is in DC) may disconnect from the SN 106B (i.e., the PSCell and all of SCell(s) of the SN 106B if configured) in response to the initiation or the detection. The random access procedure can be a four-step procedure or a two-step procedure, and can be contention-based or contention-free. After the UE 102 successfully completes the random access procedure 580, the C-SN 106A starts operating as an SN 106A, and the UE 102 operates 590 in DC with the MN 104A and the SN 106A via the C-PSCell 126A (i.e., the new PSCell), in accordance with the C-SN configuration.

In some implementations, the MN 104A may include 528 the C-SN configuration in an RRC reconfiguration message, include the RRC reconfiguration message in the conditional configuration and then include the conditional configuration in the RRC container message. The UE 102 may transmit an RRC reconfiguration complete message to the MN 104A in response to the determination 570. In turn, the MN 104A may forward the RRC reconfiguration complete message to the C-SN 106A, e.g., in an SN Reconfiguration Complete message. If the MN 104A is implemented as a gNB, the RRC reconfiguration message and the RRC reconfiguration complete message can be an RRCReconfiguration message and an RRCConnectionReconfigurationComplete message, respectively. If the MN 104A is implemented as an eNB or a ng-eNB, the RRC reconfiguration message and the RRC reconfiguration complete message can be implemented as an RRCReconfiguration message and an RRCConnectionReconfigurationComplete message, respectively. In some implementations, the UE 102 sets a transaction identifier to a value of a transaction identifier in the RRC reconfiguration message and includes the transaction identifier in the RRC reconfiguration complete message. The MN 104A can correlate the RRC reconfiguration complete message to the RRC reconfiguration message according to the value of the transaction identifier. The MN 104A may set the transaction identifiers in the RRC container message and RRC reconfiguration message to different values.

In some implementations, the C-SN 106A identifies the UE 102 by retrieving the identity of the UE 102 from a MAC PDU, which the UE 102 transmits 580 during the random access procedure. The C-SN 106A can include the identity of the UE 102 in the C-SN configuration. In other implementations, the C-SN 106A identifies the UE 102 if the C-SN 106A receives a dedicated random access preamble from the UE 10 when performing 580 the random access procedure. The C-SN 106A can include the dedicated random access preamble in the C-SN configuration.

In some implementations, the C-SN 106A generates a complete configuration for a C-SN configuration and includes a full configuration indication in the C-SN configuration. In other implementations, the C-SN 106A determines it should generate a complete configuration for a C-SN configuration and include a full configuration indication in the C-SN configuration if the C-SN 106A determines that the SN 106B is implemented by a different manufacturer (and thus certain issues with compatibility may be expected). In yet other implementations, the C-SN 106A determines it should generate a complete configuration for a C-SN configuration and include a full configuration indication in the C-SN configuration, if the C-SN 106A is not able to generate a delta configuration for a C-SN configuration according to the SN configuration received 522 in the SN Request message. For example, the MN 104A may indicate the SN configuration is not up-to-date, so that the C-SN 106A cannot use the SN configuration to generate a delta configuration for a C-SN configuration. In further implementations, the MN 104A can indicate that the C-SN 106A should generate a complete configuration for a C-SN configuration and include a full configuration indication in the C-SN configuration. In additional implementations, the C-SN 106A may determine it should include a delta C-SN configuration in an SN Request Acknowledge message during a conditional SN Change procedure, if the C-SN 106A determines that the SN 106B is from the same manufacturer for example, of if the C-SN 106A is preconfigured to do so.

Similar to the examples discussed above with reference to FIG. 4, the delta C-SN configuration is not a complete configuration and does not include a full configuration indication. The UE 102 cannot only use the delta C-SN configuration to communicate with the C-SN 106A: the UE 102 must also refer to the SN configuration stored in the UE 102. The delta C-SN configuration can include one or multiple configuration parameters for the UE 102 to communicate with the C-SN 106A via the C-PSCell 126A. The multiple configuration parameters may configure radio resources for the UE 102 to communicate with the C-SN 106A via the C-PSCell 126A and zero, one, or more C-SCells of the C-SN 106A. The multiple configuration parameters may or may not configure zero, one, or more radio bearers. The one or more radio bearers can include an SRB and/or DRB(s). The multiple configuration parameters may or may not include a measurement configuration and/or a security configuration.

The SN configuration can include multiple configuration parameters for the UE 102 to communicate with the SN 106B via the PSCell 126B and zero, one, or more secondary cells (SCells) of the SN 106B. The multiple configuration parameters may configure radio resources for the UE 102 to communicate with the SN 106B via the PSCell 126B and zero, one, or more SCells of the SN 106B. The multiple configuration parameters may configure zero, one, or more radio bearers. The one or more radio bearers can include an SRB and/or DRBs.

Similar to the discussion of FIG. 4 above, the C-SN 106A can include an indication of the condition which UE 102 detects 570 in the conditional configuration element, in the C-SN configuration, the conditional configuration, the RRC reconfiguration message or the RRC container message.

Also similar to the scenario of FIG. 4, the MN 104A and C-SN 106A configure the C-PSCell 126A to the UE 102 at events 526, 528, 552 in advance, before the C-PSCell 126A becomes suitable for the UE 102. When the C-PSCell 126A becomes suitable for the UE 102 (i.e., the UE 102 detects 570 the corresponding condition), the UE 102 performs the random access procedure with the C-PSCell to quickly change PSCell (i.e., change SN), in contrast to the immediate PSCell change procedure.

Figure 6:
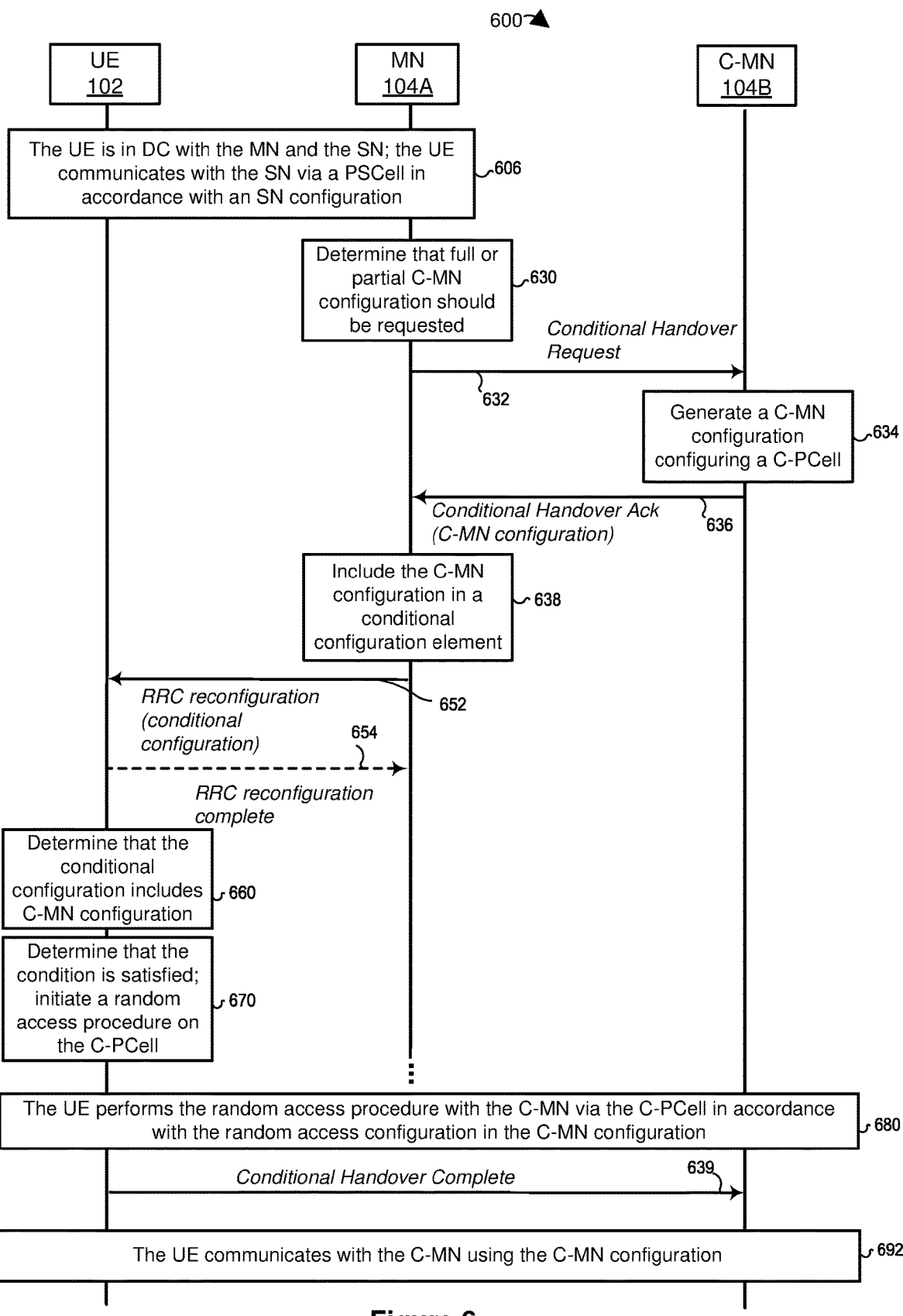
FIG. 6 is a messaging diagram of an example scenario in which the MN of FIG. 1A initiates a conditional handover procedure, via a request to a C-MN, in accordance with the techniques of this disclosure.

Next, FIG. 6 illustrates a scenario 600 that involves conditional handover. In this scenario, the base station 104A operates as a MN, and the base station 104B operates as a candidate base station (C-MN) for the conditional handover.

In this scenario, the UE 102 communicates 606 with the MN 104A in accordance with an MN configuration. The UE 102 may be in SC with the MN 104A or in DC with the MN 104A and SN 106A. The MN 104A determines 630 that it should request a C-MN configuration for the UE 102. The C-MN configuration configures a candidate PCell (C-PCell) 124B of the C-MN 104B. The MN 104A can make this determination based on one or more measurement results received from the UE directly (e.g., via an SRB established between the UE 102 and the MN 104A or via a physical control channel), or obtained by the MN 104A from measurements of signals, control channels or data channels received from the UE 102, for example, or another suitable event. In response to the determination, the MN 104A sends 632 a Conditional Handover Request message to the C-MN 104B.

In response to the Conditional Handover Request message, the C-MN 104B generates 634 a C-MN configuration. The C-MN 104B then sends a 632 Conditional Handover Request Acknowledge message including the C-MN configuration to the MN 104A. The MN 104A includes 638 the C-MN configuration in a conditional configuration and transmits 652 an RRC reconfiguration message including the conditional configuration to the UE 102. The UE 102 may transmit 654 an RRC reconfiguration complete message to the MN 104A in response to the RRC reconfiguration message 652. The UE 102 can determine 660 the conditional configuration includes the C-MN configuration, using the techniques discussed in more detail below.

In some implementations, the Conditional Handover Request message can be a Handover Request message defined in 3GPP TS 36.423 or TS 38.423 and the MN 104A may include a conditional handover request indication in the Handover Request message. In some implementations, the MN 104A may include the MN configuration in the Handover Request message. In other implementations, the MN 104A may not include the MN configuration in the Handover Request message.

At a later time, the UE 102 can detect 670 a condition (or conditions) for connecting to the C-PCell 124B is satisfied and initiate 670 random access procedure on the C-PCell 124B in response to the detection. In response to the initiation, the UE 102 can perform 680 the random access procedure with the C-MN 104B via the C-PCell 124B using a random access configuration in the C-MN configuration. The UE 102 may disconnect from the PCell of the MN 104A in response to the initiation or the detection. Similar to the scenarios above, the random access procedure can be a two-step procedure or a four-step procedure, and a contention-based procedure or a contention-free procedure. The UE 102 may transmit 639 a Conditional Handover Complete message via the C-PCell 124B to the C-MN 106B in/after 618 the random access procedure in response to the C-MN configuration.

After the UE 102 successfully completes the random access procedure 680 or transmitting 639 the Conditional Handover Complete message, the UE 102 can communicate 692 with the C-MN 104B via the C-PCell 124B (i.e., new PCell 124B) in accordance with the C-MN configuration. The UE 102 may transmit 639 the Conditional Handover Complete message during or after the random access procedure. In some implementations, the UE 102 may transmit the Conditional Handover Complete message in a message 3 of the 4-step random access procedure or in a message A of the 2-step random access procedure.

The C-MN 104B can determine the identity of the UE 102 similar to the scenarios discussed above, e.g., using the MAC PDU.

Similar to the C-MN configuration discussed above, the C-MN configuration can be a complete and self-contained configuration (i.e. full configuration). In the C-MN configuration, the C-MN 106B may include a full configuration indication (an information element (IE) or a field) which indicates the C-MN configuration is a complete and self-contained configuration (i.e. full configuration). The UE 102 can directly use the C-MN configuration to communicate with the C-MN 104B without referring to the previously received MN configuration. In other implementations, the C-MN configuration can include one or more configurations on top of the MN configuration (i.e., delta configuration). The UE 102 can use the C-MN configuration together with the MN configuration to communicate with the C-MN 106B at event 622.

The C-MN configuration can include multiple configuration parameters for the UE 102 to communicate with the C-MN 106B via the C-PCell 124B. The multiple configuration parameters may configure radio resources for the UE 102 to communicate with the C-MN 104B via the C-PCell 124B and zero, one, or more candidate secondary cells (C-SCells) of the C-MN 106B. The multiple configuration parameters may configure zero, one, or more radio bearers. The one or more radio bearers can include SRB(s) and/or DRB(s). The SRB(s) may include SRB1 and/or SRB2.

In some implementations, the C-MN 104B may be pre-configured to generate a complete configuration for a C-MN configuration and include a full configuration indication in the C-MN configuration. In other implementations, the C-MN 104B may determine to generate a complete configuration for a C-MN configuration and include a full configuration indication in the C-MN configuration if the C-MN 104B determines that the MN 104A is from a different manufacturer. In yet other implementations, the C-MN 104B may determine it should generate a complete configuration for a C-MN configuration and include a full configuration indication in the C-MN configuration if the C-MN 104B cannot generate a delta configuration for a C-SN configuration according to the MN configuration received 632 in the Conditional Handover Request message. For example, the MN 104A may indicate the MN configuration is not up-to-date so that the C-MN 104B cannot use the MN configuration to generate a delta configuration for a C-MN configuration. In further implementations, the MN 104A may instruct the C-MN 104B to generate a complete configuration for a C-MN configuration and include a full configuration indication in the C-MN configuration. In additional implementations, the C-MN 104B may determine it should generate a delta C-MN configuration in a Conditional Handover Request Acknowledge message during a conditional handover procedure if the C-MN 104B determines that the MN 104A operates is from the same manufacturer or is pre-configured to do so.

Similar to the delta C-SC configuration, the delta C-MN configuration is not a complete configuration and does not include a full configuration indication. The UE 102 cannot use only the delta C-MN configuration to communicate with the C-MN 104B; the UE 102 must also refer to the MN configuration stored in the UE 102. The delta C-MN configuration can include one or multiple configuration parameters for the UE 102 to communicate with the C-MN 104B via the C-PCell 124B. The multiple configuration parameters may configure radio resources for the UE 102 to communicate with the C-MN 104B via the C-PCell 124B and zero, one, or more C-SCells of the C-MN 104B. The multiple configuration parameters may or may not configure zero, one, or more radio bearers. The one or more radio bearers can include an SRB and/or DRB(s). The multiple configuration parameters may or may not include a measurement configuration and/or a security configuration.

The MN configuration can include multiple configuration parameters for the UE 102 to communicate with the MN 104A via the PCell 124A and zero, one, or more secondary cells (SCells) of the MN 104A. The multiple configuration parameters may configure radio resources for the UE 102 to communicate with the MN 104A via the PCell 124A and zero, one, or more SCells of the MN 104A. The multiple configuration parameters may configure zero, one, or more radio bearers. The one or more radio bearers can include SRB(s) and/or DRB(s). The SRB(s) may include SRB1 and/or SRB2.

The C-MN 104B can include the condition the UE 102 evaluates at event 670 in the conditional configuration element, in the C-MN configuration, or the RRC reconfiguration message.

Also generally similar to the C-SN, the C-MN configuration can include a group configuration (CellGroupConfig) IE that configures the C-PCell 124B and may configure zero, one, or more C-SCells of the C-MN 104B. In one implementation, the C-MN configuration can be a RRCReconfiguration message, RRCReconfiguration-IEs or the Cell-GroupConfig IE conforming to 3GPP TS 38.331. In this implementation, the Conditional Handover Complete message can be a RRCReconfigurationComplete message. The full configuration indication may be a field or an IE conforming to 3GPP TS 38.331. In other implementations, the C-MN configuration can include a RadioResourceConfigDedicated IE and/or a MobilityControlInfo IE configuring the C-PCell 124B and may or may not include SCell-ToAddModList IE configuring one or more C-SCells of the C-MN 104B. In one implementation, the C-MN configuration can be a RRCConnectionReconfiguration message or RRCConnectionReconfiguration-IEs conforming to 3GPP TS 36.331. The full configuration indication may be a field or an IE conforming to 3GPP TS 36.331. In this implementation, the Conditional Handover Complete message can be a RRCConnectionReconfigurationComplete message.

In some implementations, the MN configuration can include a CellGroupConfig IE that configures the PCell 124A and may configure zero, one, or more SCells of the MN 104A. In one implementation, the MN configuration is an RRCReconfiguration message, RRCReconfiguration-IEs or the CellGroupConfig IE conforming to 3GPP TS 38.331. In other implementations, the MN configuration can include a RadioResourceConfigDedicated IE and/or a MobilityControlInfo IE configuring the PCell 124A and may or may not include SCellToAddModList IE configuring one or more SCells of the MN 104A.

If the MN 104A is implemented as a gNB, the RRC reconfiguration message and the RRC reconfiguration complete message can be an RRCReconfiguration message and an RRCConnectionReconfigurationComplete message, respectively. If the MN 104A is implemented as an eNB or a ng-eNB, the RRC reconfiguration message and the RRC reconfiguration complete message can be implemented as an RRCReconfiguration message and an RRCConnectionReconfigurationComplete message, respectively.

In some implementations, the C-MN 104B can include a CU 172 and one or more DU 174 as shown in FIG. 1B. The CU 172 receives the Conditional Handover Request message from the MN 104A and sends the Conditional Handover Request Acknowledge message. The DU 174 may generate the C-MN configuration or part of the C-MN configuration and send the C-MN configuration or part of the C-MN configuration to the CU 172. In case of the DU 174 generates the part of the C-MN configuration, the CU 172 may generate rest of the C-MN configuration. In one implementation, the DU 174 can perform 680 the random access procedure with the UE 102 and identify the UE 102 in the random access procedure. In response to the identification, the DU 174 communicates with the UE 102 using the C-MN configuration or part of the C-MN configuration. In another implementation, the DU 174 can perform the random access procedure 618 with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the rest of the C-MN configuration and part of the C-MN configuration respectively.

If the C-MN 106B identifies the UE 102 on the C-PCell 124B at event 680, the C-MN 104B (i.e., becoming the MN 104B) begins to transmit downlink control information (DCI) command(s) on physical downlink control channel(s) (PDCCH(s)), reference signal(s) or data to the UE 102 via the C-PCell 124B and/or one or more C-SCells (if configured in the C-MN configuration) according to some configuration parameters in the C-MN configuration. If the C-MN 106B identifies the UE 102 on the C-PCell 124B at event 680, the C-MN 106B may receive signal(s) on PUCCH(s), sounding reference signal(s) or data from the UE 102 via the C-PCell 124B and/or one or more C-SCells (if configured in the C-MN configuration) according to some configuration parameters in the C-MN configuration. The UE 102 receives the DCI command(s) on PDCCH(s), reference signal(s) or data from the C-MN 104B via the C-PCell 124B and/or one or more C-SCells (if configured in the C-MN configuration) according to some configuration parameters in the C-MN configuration. The UE 102 may transmit signal(s) on PUCCH(s), sounding reference signal(s) or data to the C-MN 104B via the C-PCell 124B and one or more C-SCells (if configured in the C-MN configuration) according to some configuration parameters in the C-MN configuration. In response to the identification, the C-MN 104B becomes MN 104B and determines that the C-PCell 124B becomes PCell 124B and the one or more C-SCells becomes one or more SCells.

Thus, in the scenario of FIG. 6, the MN 104A configures C-PCell 124B for the UE 102 at events in advance, before the C-PCell 124B becomes suitable for the UE 102. When the C-PCell 124B becomes suitable for the UE 102 (i.e., the UE 102 detects the corresponding condition), the UE 102 performs the random access procedure with the C-PCell 124B to quickly hand over to the C-PCell 124B. In contrast to the immediate handover procedure, the conditional handover technique discussed in this disclosure significantly reduces latency associated with handover configuration.

Figure 7:
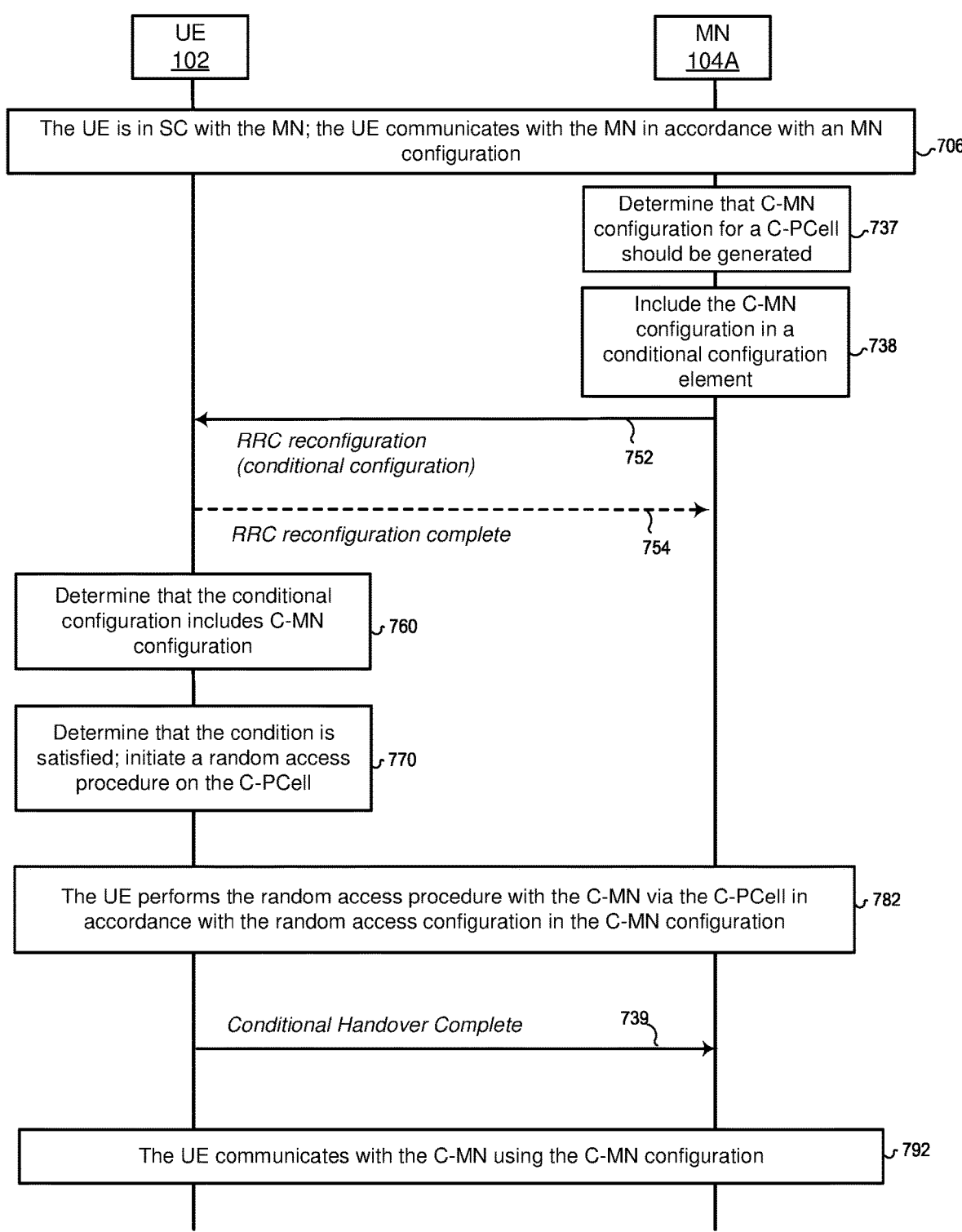
FIG. 7 is a messaging diagram of an example scenario in which the MN of FIG. 1A initiates a conditional handover procedure for another PCell, in accordance with the techniques of this disclosure.

Next, FIG. 7 illustrates another scenario 700 that involves conditional handover, similar to FIG. 6. In this scenario, the base station 104A operates as a MN for the conditional handover. The differences between the scenarios of FIG. 6 and FIG. 7 are discussed below.

In the scenario 700 of the FIG. 7, the UE 102 communicates 706 with the MN 104A via a certain PCell (other than the cell 124A) according to a certain MN configuration. The UE 102 may be in SC with the MN 104A, or in DC with the MN 104A and SN 106A, for example (not illustrated in FIG. 7). The MN 104A determines 737 that it should generate a C-MN configuration for the UE 102. The C-MN configuration configures C-PCell 124A of the MN 104A. The MN 104A can make this determination based on one or more measurement results received from the UE directly (e.g., via an SRB established between the UE 102 and the MN 104A or via a physical control channel), or obtained by the MN 104A from measurements on signals, control channels or data channels received from the UE 102, for example, or another suitable event. In response to the determination, the MN 104A generates 738 a conditional configuration including the C-MN configuration. The MN 104A then transmits 752 an RRC reconfiguration message including the conditional configuration to the UE 102. The UE 102 can transmit 754 an RRC reconfiguration complete message to the MN 104A in response to receiving 752 the RRC reconfiguration message. The UE 102 can determine 760 that the conditional configuration includes the C-MN configuration.

Subsequently, UE 102 can detect 770 a condition (or conditions) for connecting to the C-PCell 124A is met and initiates 770 a random access procedure on the C-PCell 124A in response to the detection. The UE 102 then performs 782 the random access procedure with the MN 104A via the C-PCell 124A using a random access configuration in the C-MN configuration. The UE 102 can disconnect from the PCell of the MN 104A in response to event 770 or 780 for example. The random access procedure can be any suitable procedure (two-step, four-step, contention-based, contention-free, etc.). The UE 102 can transmit 739 a conditional handover complete message via the C-PCell 124A to the MN 104A during or after performing 782 the random access procedure in response to the C-MN configuration.

After the UE 102 successfully completes 782 the random access procedure or after transmitting 739 the Conditional Handover Complete message, the UE 102 can communicate 792 with the MN 104A via the C-PCell 124A (i.e., new PCell 124A) in accordance with the C-MN configuration. The MN 104A can determine that the UE 102 connects to the C-PCell 124A if the MN 104A finds the identity of the UE 102 in a MAC PDU received from the UE 102 during the random access procedure (event 782), for example. The MN 104A can include the identity of the UE 102 in the C-MN configuration. In other implementations, the MN 104A determines that the UE 102 connects to the C-PCell 124A if the MN 104A receives a dedicated random access preamble from the UE 102 in the random access procedure (event 782). The MN 104A includes the dedicated random access preamble in the C-MN configuration.

The C-MN configuration can be a full configuration or a delta configuration, depending on the implementation. The C-MN configuration can include multiple configuration parameters for the UE 102 to communicate with the MN 104A via the C-PCell 124A. The multiple configuration parameters may configure radio resources for the UE 102 to communicate with the MN 104A via the C-PCell 124A and zero, one, or more candidate secondary cells (C-SCells) of the MN 104A. The multiple configuration parameters may configure zero, one, or more radio bearers. The one or more radio bearers can include SRB(s) and/or DRB(s). The SRB(s) may include SRB1 and/or SRB2.

In some implementations, the MN 104A is preconfigured to generate a complete configuration for a C-MN configuration and include a full configuration indication in the C-MN configuration. In other implementations, the MN 104A can determine that it should generate a complete configuration for a C-MN configuration and include a full configuration indication in the C-MN configuration if the MN 104A (i.e., a CU 172) identifies a DU 174 of the C-PCell 124A operates in a different vendor from a DU 174 of the PCell. In yet other implementations, the MN 104A can determine it should generate a complete configuration for a C-MN configuration and include a full configuration indication in the C-MN configuration if the MN 104A is not able to generate a delta configuration for a C-SN configuration. In additional implementations, the MN 104A may determine it should generate a delta C-MN configuration in a conditional handover procedure if the MN 104A is pre-configured to do so or if the MN 104A (i.e., a CU 172) identifies a DU 174 of the C-PCell 124A comes from the same manufacturer as a DU 174 of the PCell.

Next, several example methods the UE can implement to determine to what type of a base station (MN, SN) a conditional configuration information is related, and/or to what conditional procedure the conditional configuration information pertains, are discussed with reference to FIGS. 8-16.

Figure 8:
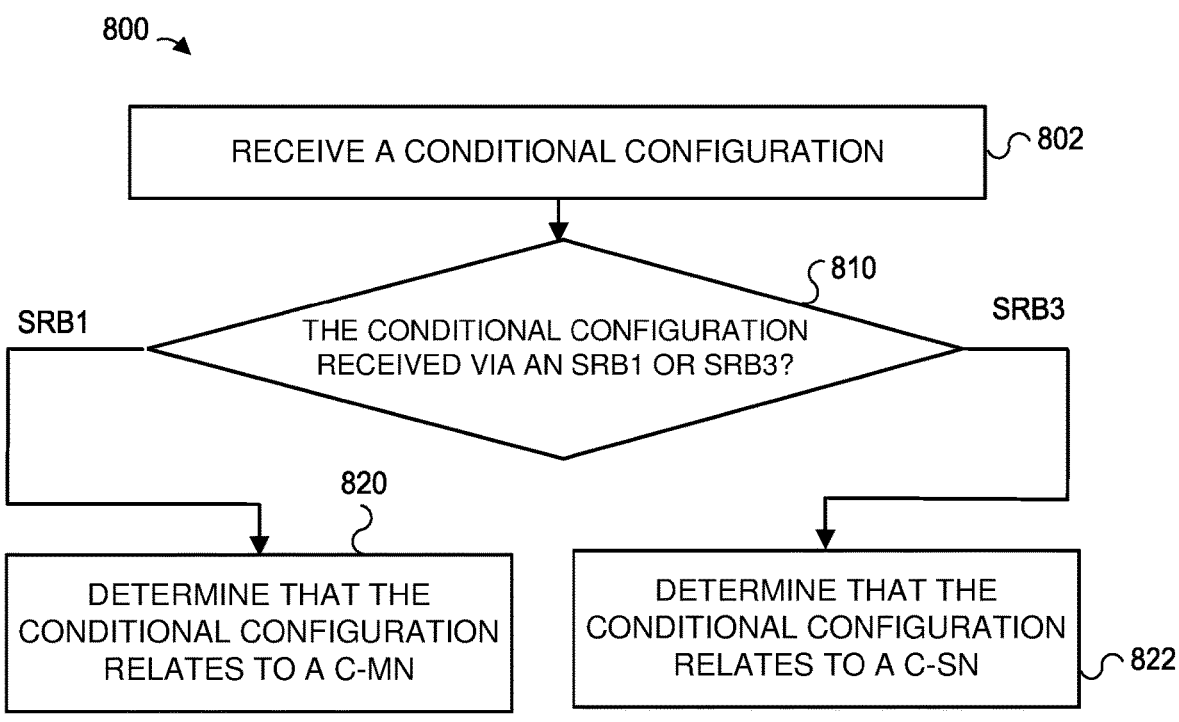
FIG. 8 is a flow diagram of an example method for determining, in view of the SRB via which a conditional configuration arrived, whether the conditional configuration pertains to a C-MN or C-SN, which can be implemented in the UE of FIG. 1A.

Referring first to FIG. 8, an example method 800 for handling a conditional configuration can be implemented in the UE 102 of FIG. 1A for example. The method 800 begins at block 802, where the UE 102 receives a conditional configuration (event 458, 652, 752). The UE 102 at block 810 determines whether the UE 102 received the conditional configuration via an SRB1 (event 652, 752) or SRB3 (event 458). If the UE 102 determines that the conditional configuration arrived via an SRB1, the UE 102 at block 820 determines that the conditional configuration includes (or, more generally, relates to) a C-MN configuration. On the other hand, if the UE 102 determines the conditional configuration arrived via an SRB3, the UE 102 at block 822 determines that the conditional configuration includes a C-SN configuration. More specifically, the C-SN configuration is applied for CPAC.

Figure 9:
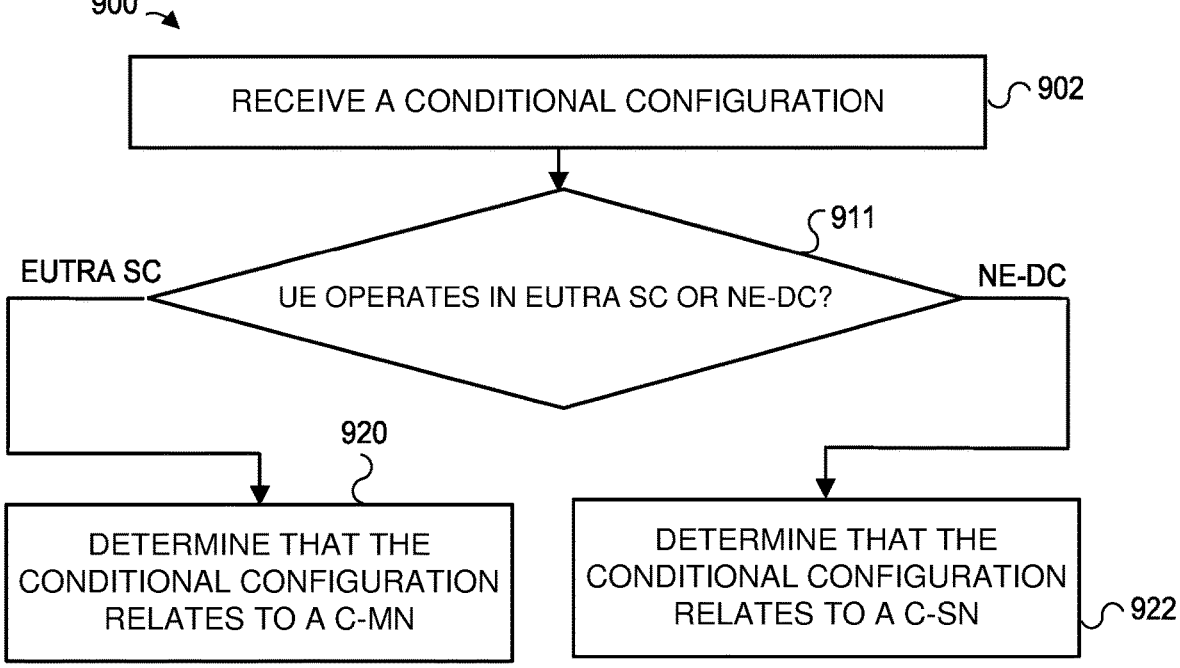
FIG. 9 is a flow diagram of an example method for determining, in view of EUTRA SC/DC connectivity, whether a conditional configuration pertains to a C-MN or C-SN, which can be implemented in the UE of FIG. 1A.

FIG. 9 is a flow diagram of an example method 900 that begins at block 902, where the UE 102 receives a conditional configuration in an E-UTRA RRC message (event 458, 652, 752). In some implementations, the E-UTRA RRC message can be a RRCConnectionReconfiguration message. At block 911, the UE 102 determines whether the UE operates in E-UTRA standalone mode (i.e., single connectivity) or in NR-E-UTRA dual connectivity (NE-DC). If the UE 102 is in E-UTRA standalone mode, the UE 102 at block 920 determines that the conditional configuration includes a C-MN configuration. If the UE 102 is in NE-DC, the UE 102 at block 922 determines that the conditional configuration includes a C-SN configuration. The C-SN configuration can be applied for CPAC or CSAC.

Figure 10:
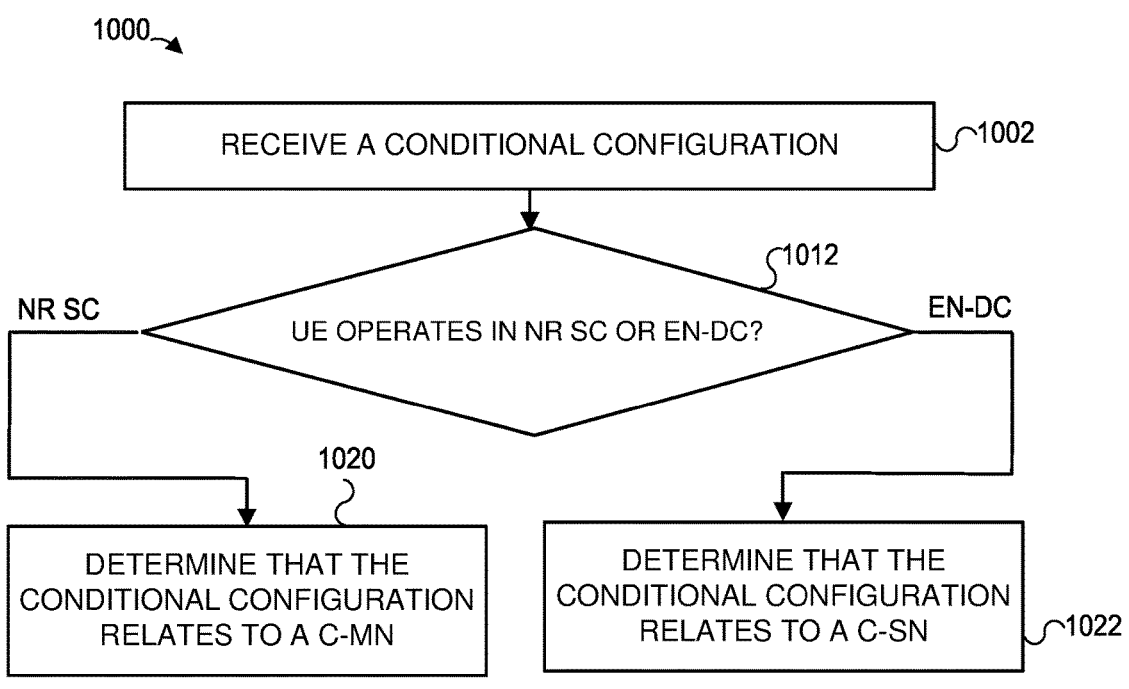
FIG. 10 is a flow diagram of an example method for determining, in view of NR SC/DC connectivity mode, whether a conditional configuration pertains to a C-MN or C-SN, which can be implemented in the UE of FIG. 1A.

FIG. 10 is a flow diagram of an example method 1000 for determining, in view of NR SC/DC connectivity mode, whether a conditional configuration pertains to a C-MN or C-SN, which also can be implemented in the UE of FIG. 1A. At block 1002, the UE 102 receives a conditional configuration in an NR RRC message (event 458, 652, 752). In some implementations, the NR RRC message can be a RRCReconfiguration message. Next, at block 1012, the UE 102 determines whether the UE 102 operates in NR standalone mode (i.e., single connectivity) or in E-UTRA-NR dual connectivity (EN-DC). When the UE 102 is in EN-DC, the UE 102 may connect to an EPC or 5GC. In case of 5GC, the EN-DC corresponds to the next generation (NG) EN-DC. If the UE 102 is in the NR standalone mode, the UE 102 at block 1020 determines that the conditional configuration includes a C-MN configuration. If the UE 102 is in EN-DC, the UE 102 at block 1022 determines that the conditional configuration includes a C-SN configuration. The C-SN configuration can be applied for CPAC or CSAC.

Figure 11:
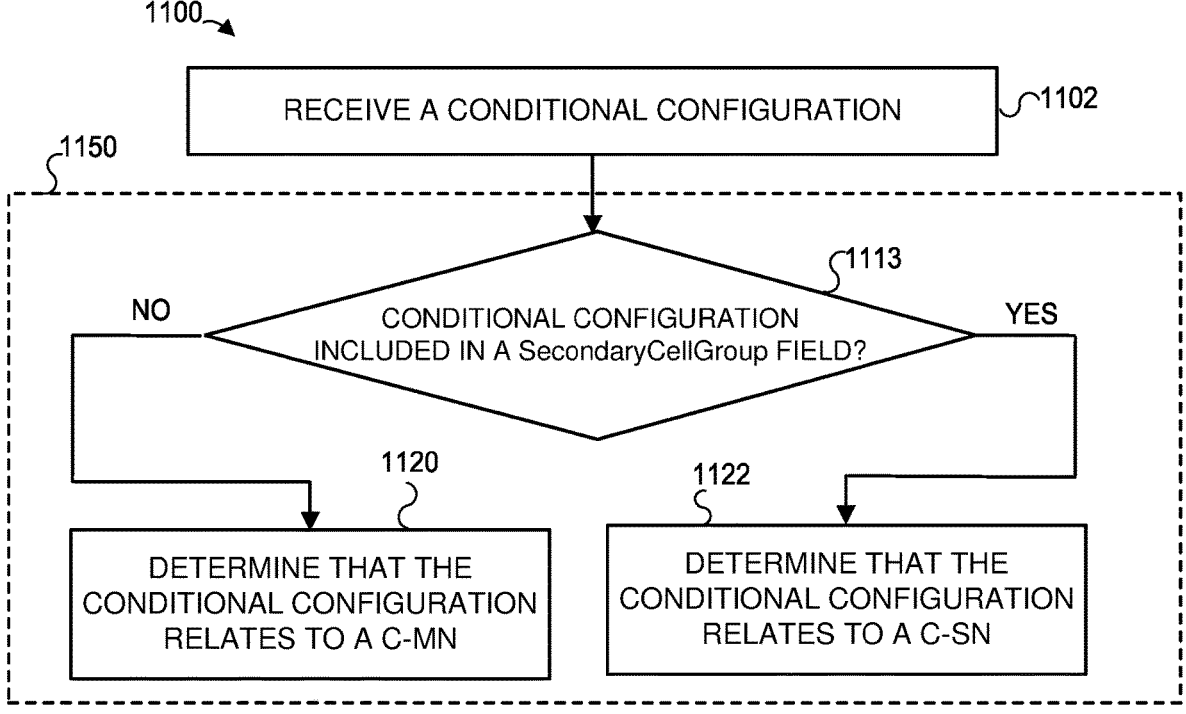
FIG. 11 is a flow diagram of an example method for determining, in view of whether conditional configuration arrived in a secondaryCellGroup field, whether the conditional configuration pertains to a C-MN or C-SN, which can be implemented in the UE of FIG. 1A.

FIG. 11 is a flow diagram of an example method 1100 for determining whether the conditional configuration pertains to a C-MN or C-SN, which also can be implemented in the UE of FIG. 1A. The method 1100 begins at block 1102, where the UE 102 receives a conditional configuration (event 458, 652, 752). At block 1113, the UE 102 determines whether the conditional configuration is included in a secondaryCellGroup field (or the conditional configuration is identified by the secondaryCellGroup field or the conditional configuration is included in an RRC reconfiguration message identified by the secondaryCellGroup field). If the conditional configuration is not included in the secondaryCellGroup field, the UE 102 at block 1120 determines that the conditional configuration includes a C-MN configuration. If the conditional configuration is included in the secondaryCellGroup field, the UE 102 at block 1122 determines that the conditional configuration includes a C-SN configuration. Blocks 1113, 1120, and 1122 collectively define a secondaryCellGroup check procedure 1150. More specifically, the C-SN configuration is applied for CPAC.

According to the example methods 800, 900, 1000, and 1100, the UE 102 can determine that the conditional configuration includes C-MN configuration and accordingly apply the conditional configuration in a conditional handover procedure, or the UE 102 can determine that the conditional configuration includes C-SN configuration and accordingly apply the conditional configuration in a conditional PSCell addition or change procedure, with or without the SN change.

Figure 12:
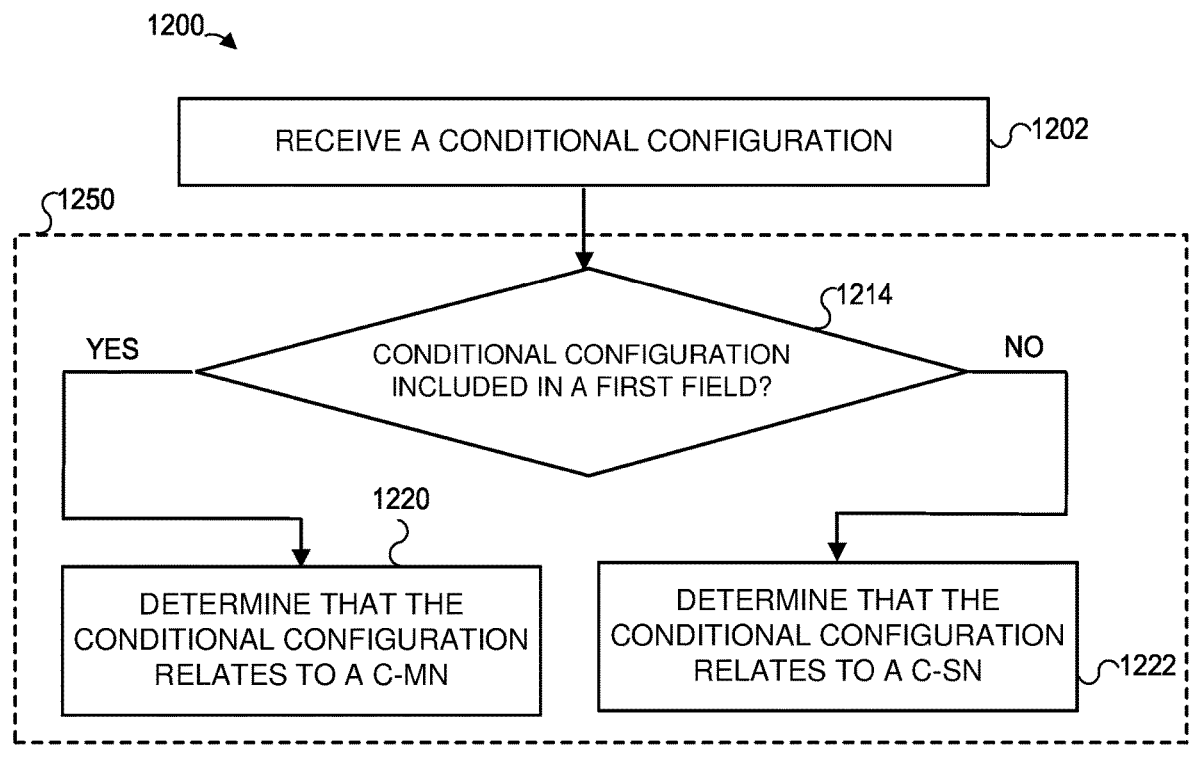
FIG. 12 is a flow diagram of an example method for determining, in view of a type of a field or IE in which conditional configuration arrived, whether the conditional configuration pertains to a C-MN or C-SN, which can be implemented in the UE of FIG. 1A.

FIG. 12 illustrates another example method 1200 which relies on the type of a field, IE, value, etc. in which conditional configuration arrives, or which references the conditional configuration. The method 1200 begins at block 1202, where the UE 102 receives a conditional configuration (event 352, 458, 552, 652, 752).

The UE 102 at block 1214 determines whether the conditional configuration is included in a first field (or the conditional configuration is identified by the first field). The first field can be an IE specifically dedicated to carrying C-MN configuration or conditional handover configuration for example. In another implementation, the first field can be a flag or an indicator included in the conditional configuration to indicate that the configuration pertains to conditional handover. Further, the first field can correspond to a certain value of an indicator that specifies the conditional procedure to which the conditional configuration pertains.

In any case, if the conditional configuration is included in the first field, the UE 102 at block 1220 determines that the conditional configuration includes a C-MN configuration. If the conditional configuration is not included in the first field, the UE 102 at block 1222 determines that the conditional configuration includes a C-SN configuration. In some implementations, the first field specifically indicates the conditional configuration is for conditional handover, and the UE 102 uses the first field to determine that the conditional configuration includes a C-MN configuration. Blocks 1214, 1220, and 1222 collectively define a dedicated field check procedure 1250.

If the conditional configuration is not included in the first field, the conditional configuration in some implementations is included in a second field (or the conditional configuration is identified by the second field). The second field can indicate the conditional configuration pertains to CSAC, and the UE 102 can use the second field to also determine that the conditional configuration includes a C-SN configuration for CSAC.

The conditional configuration may include a condition configuration including a measurement identity. The UE 102 in SC with a MN or in DC with a MN and a SN can use the measurement identity to identify a measurement configuration configured by the MN. The measurement configuration may include a condition (i.e., triggering condition) for the C-SN configuration, so that the UE 102 evaluates the condition to determine whether the condition is satisfied, for a CSAC procedure.

If the conditional configuration is not included in the first field, the conditional configuration in other implementations is included in a third field (or the conditional configuration is identified by the third field). The third field can indicate that the conditional configuration is configured for a CPAC procedure, and the UE 102 can use the third field to also determine that the conditional configuration includes a C-SN configuration for CPAC. Alternatively, the UE 102 can use any of the previous method (e.g., method 800, 1100) to determine the condition configuration is configured for CPAC procedure.

The conditional configuration may include a condition configuration including a measurement identity (MeasId). As discussed in more detail below, the UE 102 operating in DC with an MN and an SN can use the measurement identity to identify a measurement configuration configured by the SN. The measurement configuration can include a condition (i.e., triggering condition) for the C-SN configuration, so that the UE 102 evaluates the condition to determine whether the condition is satisfied, for a CPAC procedure. The UE 102 may receive a field (e.g., the first, second or third field), or the conditional configuration with the field (event 352, 458, 552, 652, 752) from a base station (e.g., SN 106A or MN 104A). In one example scenario, the UE 102 receives the first field, or the conditional configuration with the first field (events 652, 752) from MN 104A. In another example, the UE 102 receives the second field, or the conditional configuration with the second field, events 352, 458) from the SN 106A. In yet another example, the UE 102 may receive the third field, or the conditional configuration with the third field, from the MN 104A.

According to the methods of FIGS. 13-16, the UE uses a combination of the techniques discussed above to process conditional configuration.

Figure 13:
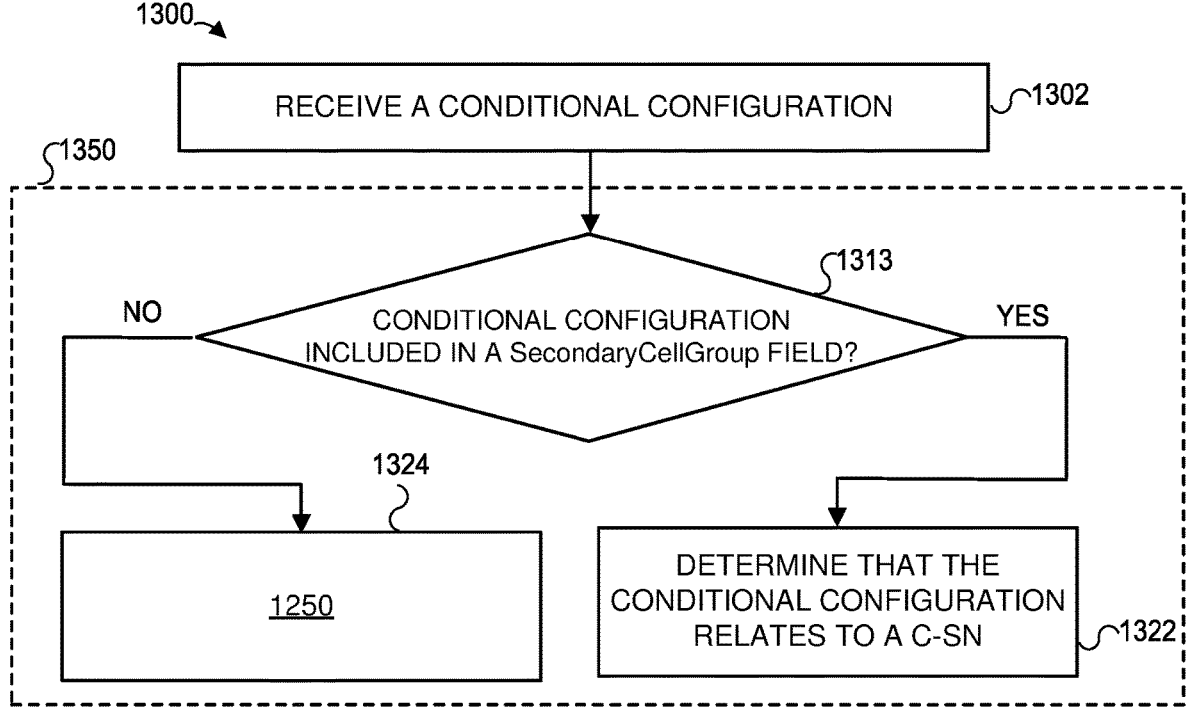
FIG. 13 is a flow diagram of an example method for determining whether a conditional configuration pertains to a C-MN or C-SN using the factors of FIGS. 11 and 12, which can be implemented in the UE of FIG. 1A.

According to the method 1300 of FIG. 13, the UE 102 receives a conditional configuration at block 1302. At block 1313, the UE 102 the UE 102 determines whether the conditional configuration is included in a secondaryCell-Group field (or the conditional configuration is identified by the secondaryCellGroup field), similar to block 1113 of FIG. 11. If the conditional configuration is not included in the secondaryCellGroup field, the flow proceeds to block 1324, where the UE 102 implements the dedicated field check procedure 1250 (see the discussion of FIG. 12 above). Otherwise, the flow proceeds to block 1322, where the UE 102 determines that the conditional configuration includes a C-SN configuration. Blocks 1214, 1220, and 1222 collectively define a combined check procedure 1250.

Figure 14:
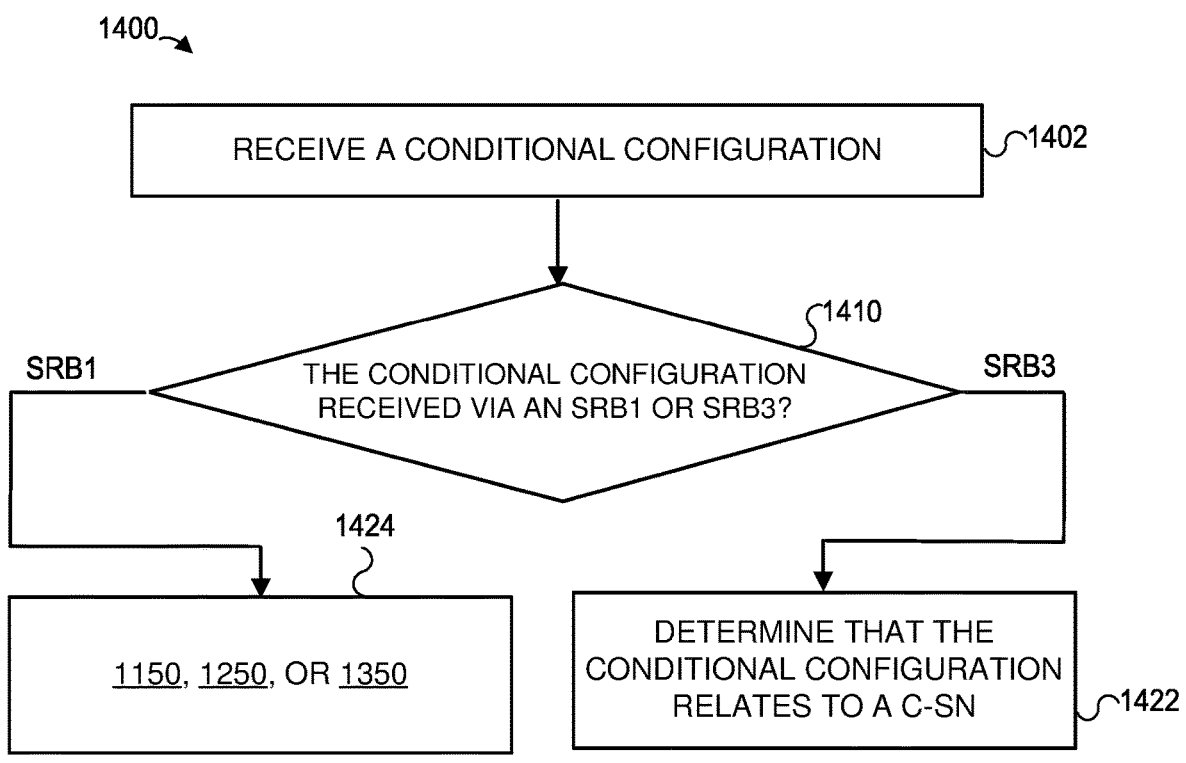
FIG. 14 is a flow diagram of an example method for determining whether a conditional configuration pertains to a C-MN or C-SN using the factors of FIGS. 11-13 and the SRB, which can be implemented in the UE of FIG. 1A.

According to the method 1400 of FIG. 14, the UE 102 receives a conditional configuration at block 1402. At block 1410, the UE 102 the UE 102 determines whether the UE 102 received the conditional configuration via an SRB1 or SRB3, similar to block 810 of FIG. 8. If the UE 102 determines that the conditional configuration arrived via an SRB1, the UE 102 at block 1424 implements one or more of the secondaryCellGroup check procedure 1150, the dedicated field check procedure 1250, or the combined check procedure 1350.

Figure 15:
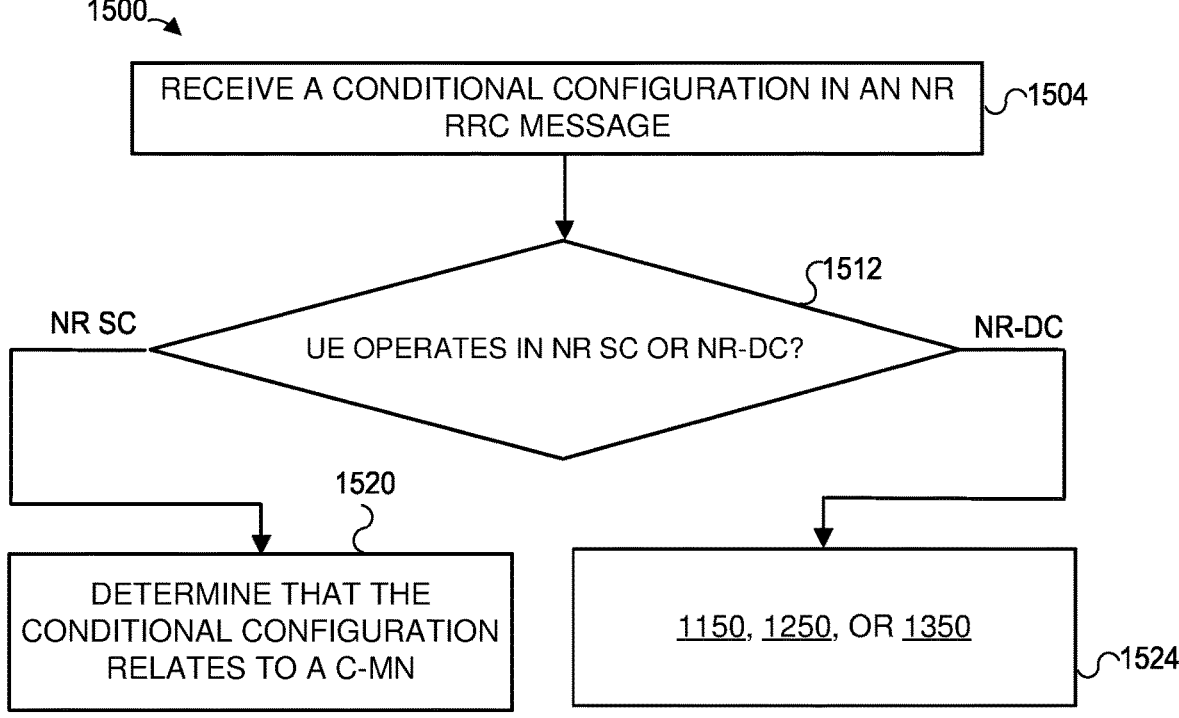
FIG. 15 is a flow diagram of another example method for determining whether a conditional configuration pertains to a C-MN or C-SN using the factors of FIGS. 11-13 and the connectivity mode, which can be implemented in the UE of FIG. 1A.

According to the method 1500 of FIG. 15, the UE 102 receives a conditional configuration at block 1502. At block 1512, the UE 102 the UE 102 determines whether the UE 102 operates in NR SC or EN-DC, similar to block 1012. When the UE 102 is in NR SC, the UE 102 at block 1520 can determine that the conditional configuration includes C-MN configuration. If the UE 102 determines that the UE 102 is operating in NR DC, the UE 102 at block 1524 implements one or more of the secondaryCellGroup check procedure 1150, the dedicated field check procedure 1250, or the combined check procedure 1350.

Figures 16, 17:
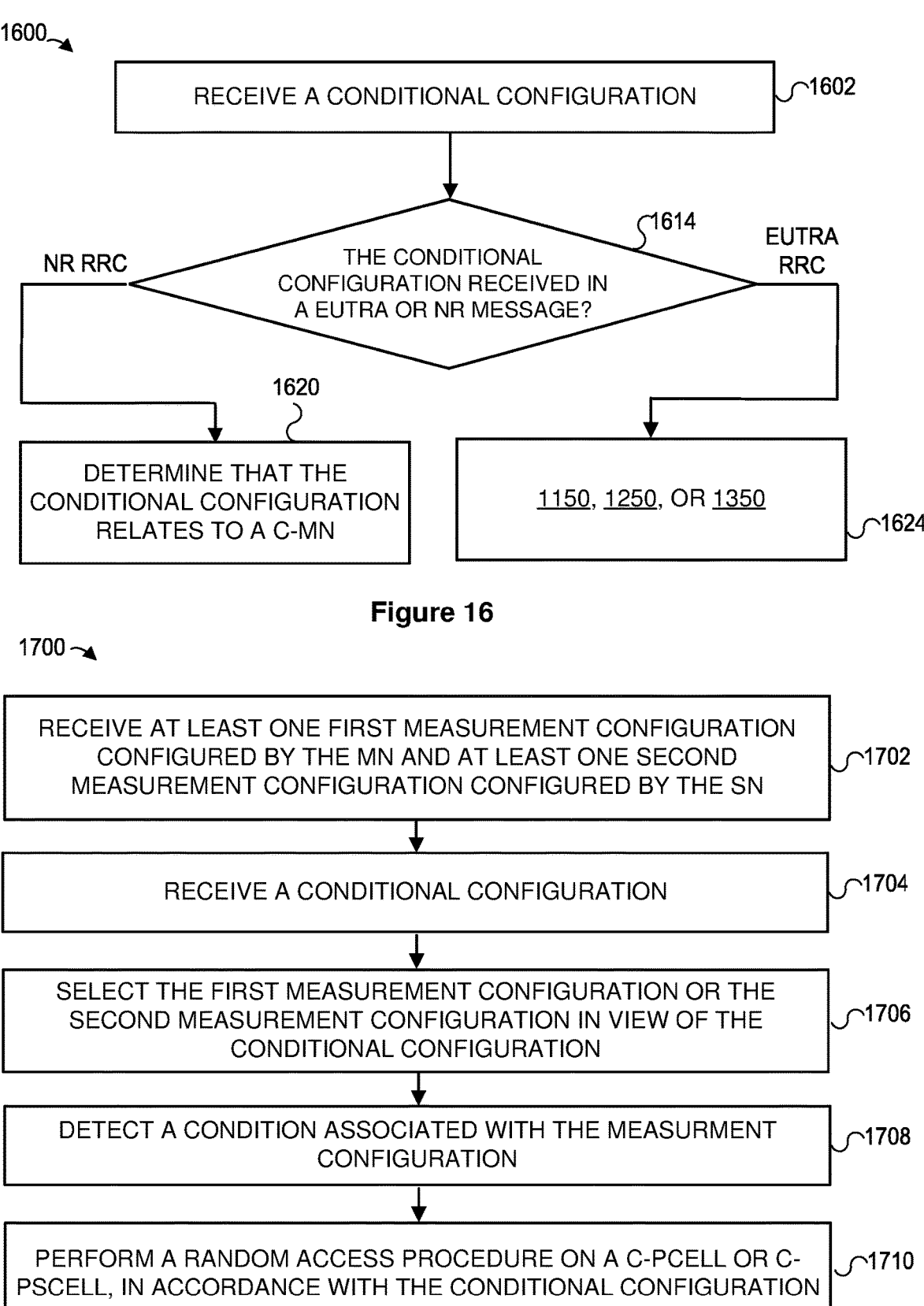
FIG. 16 is a flow diagram of an example method for determining whether a conditional configuration pertains to a C-MN or C-SN using the factors of FIGS. 11-13 and the RAT via which the conditional configuration arrived, which can be implemented in the UE of FIG. 1A.
FIG. 17 is a flow diagram of an example method for selecting a measurement configuration for use in evaluating a condition during a conditional procedure, which can be implemented in the UE of FIG. 1A.

FIG. 16 illustrates another example method 1600 for determining whether a conditional configuration pertains to a C-MN or C-SN. The method 1600 begins at block 1602, where the UE 102 receives a conditional configuration. At block 1614, the UE 102 the UE 102 determines whether the UE 102 receives the conditional configuration in a EUTRA or NR message. If the UE 102 received the conditional configuration in an NR RRC message, the UE 102 at block 1620 determines that the conditional configuration includes a C-MN configuration. If the UE 102 received the conditional configuration in a EUTRA RRC message, the UE 102 at block 1624 implements one or more of the secondary-CellGroup check procedure 1150, the dedicated field check procedure 1250, or the combined check procedure 1350.

Next, an example technique for matching a measurement configuration to a conditional configuration, which the UE 102 of FIG. 1A can implement, is discussed with reference to FIG. 17. At different times and during different procedures, the UE 102 can receive measurement configurations, which can have certain measurement identities (MeasIds). The UE 102 can receive these different measurement configurations from an MN and an SN, in some cases. The UE 102 can store these measurement configurations in the memory, at least for a certain period of time.

An example method 1700 for selecting a measurement configuration for use in evaluating a condition during a conditional procedure can be implemented in the UE of FIG. 1A.

At block 1702, the UE 102 receives at least one first measurement configuration configured by the MN 104A and at least one second measurement configuration configured by the SN 106A. Next, at block 1704, the UE 102 receives a conditional configuration (event 352, 552, 652). At block 1706, the UE 102 selects a particular measurement configuration from the at least one first measurement configuration or a particular measurement configuration from the at least one second measurement configuration in view of the received conditional configuration.

In one example scenario, the UE 102 supports only CPAC and does not support CSAC. The RAN 107 (e.g., the MN 104A and the SN 106A) is aware of this restriction, and accordingly does not attempt to provide CSAC configuration to the UE 102. Thus, when the UE 102 determines at block 1706 that the conditional configuration relates to the C-SN, the UE 102 selects at block 1704 the second measurement configuration prepared by the SN 106A, for use in a CPAC procedure. Referring back to FIGS. 3 and 4, the SN 106A in these CPAC scenarios generates the conditional configuration and provides the conditional configuration to the UE 102 via the MN 104A (scenario 300) or directly (scenario 400).

In another example scenario, the UE 102 supports only CSAC and does not support CPAC. The RAN 107 does not attempt to provide CPAC configuration to the UE 102. When the UE 102 determines at block 1706 that the conditional configuration relates to the C-SN, the UE 102 selects at block 1704 the first measurement configuration prepared by the MN 104A, for use in a CSAC procedure.

In yet another example scenario, the UE 102 supports CSAC as well as CPAC. When the UE 102 determines that the conditional configuration includes a C-SN configuration for CSAC, the UE 102 selects at block 1704 the first measurement configuration for use with the CSAC procedure. Referring back to FIG. 5, the MN 104A in this CSAC scenario generates conditional configuration and provides the conditional configuration to the UE 102.

In still another example scenario, the UE 102 determines that the UE 102 received the conditional configuration via an SRB3 or in a secondaryCellGroup field. At block 1704, the UE 102 selects the second measurement configuration configured by the SN 106A. On the other hand, when the UE 102 determines that the conditional configuration is a C-SN configuration which was not included in the secondaryCellGroup field, the UE 102 selects the first measurement configuration prepared by the MN 104A. In yet another scenario, the UE 102 determines that the conditional configuration is a C-MN configuration and selects the first measurement configuration prepared by the MN 104A.

With continued reference to FIG. 17, at block 1708 the UE 102 detects a condition associated with the measurement configuration. Finally, at block 1710, the UE 102 performs a random access procedure on a PCell (e.g., when the conditional configured by the MN and the conditional configuration includes C-MN configuration) or a PSCell (e.g., when the measurement configuration is configured by the SN, or when the conditional configured by the MN but the procedure is CSAC).

Next, several example methods for providing conditional configuration to a UE, which can be implemented in a base station of FIG. 1A, are discussed with reference to FIGS. 18-20.

Referring to FIG. 18, an example method 1800 begins at block 1801, where the base station obtains a conditional configuration (events 350, 526, 636, 737). If the base station determines at block 1802 that the conditional configuration relates to (e.g., includes) C-MN configuration, the base station includes the conditional configuration in a first field, or otherwise uses the first field to identify the conditional configuration. On the other hand, if the base station determines at block 1802 that the conditional configuration relates to (e.g., includes) C-SN configuration, the base station includes the conditional configuration in a second field, or otherwise uses the second field to identify the conditional configuration Further, in some implementations, the base station includes the conditional configuration in the second field when the conditional configuration includes a C-SN configuration for CSAC, and in a third field when the conditional configuration includes a C-SN configuration for CPAC (see the discussion of the first, second, and third fields above in connection with FIG. 12).

According to an example method 1900 of FIG. 19, the base station obtains a conditional configuration at block 1901 (events 350, 526, 636, 737). If the base station determines at block 1902 that the conditional configuration relates to (e.g., includes) C-MN configuration, the base station includes the conditional configuration in conditional configuration for a conditional handover procedure. On the other hand, if the base station determines at block 1902 that the conditional configuration relates to (e.g., includes) C-SN configuration, the base station includes the conditional configuration in a conditional configuration for PSCell addition or change.

Further, in some implementations, when the conditional configuration is a C-SN configuration for CPAC, the base station includes the candidate configuration in a conditional configuration for CPAC, at block 1906. If the candidate configuration is a C-SN configuration for CSAC, the base station in some implementations includes the candidate configuration in a conditional configuration for CSAC, at block 1906.

Referring to FIG. 20, a method 2000 begins at block 2001, where the base station obtains conditional information for application during a conditional handover procedure, a CPAC procedure, or a CSAC procedure. The base station includes the C-MN or C-SN configuration in conditional configuration specific to the corresponding procedure, at block 2002. At block 2004, the base station transmits the procedure-specific conditional configuration to the UE.

Referring generally to the techniques above, the conditional configuration (also referred to above as "conditional configuration element") may include a configuration identity or identifier (ID) identifying a corresponding C-SN configuration or C-MN configuration. In some implementations, an MN (e.g., the MN 104A) of a UE (e.g., UE 102) determines a value (e.g., a positive integer) of a configuration ID for a C-MN configuration, and determines a value (e.g., a positive integer) of a configuration ID for a C-SN configuration for CSAC, and ab SN of the UE determines a value (e.g., an positive integer) of a configuration ID for a C-SN configuration for CPAC.

In some implementations, the MN and the SN have independent configuration ID value spaces (or ranges) for the UE. The SN uses a configuration ID value space (or range) to assign configuration ID(s) (i.e., value(s)) for C-SN configuration(s) for CPAC for the UE. For example, the configuration ID value space includes 1, 2, . . . , N. N is a positive integer, e.g., 10, 16, 20, 32, 64 or 128. In one implementation, the MN uses a configuration ID value space to assign configuration ID(s) (i.e., value(s)) for C-MN configuration(s) and C-SN configuration(s) for CSAC for the UE. For example, the configuration ID value space includes 1, 2, . . . , N. N is a positive integer, e.g., 10, 16, 20, 32, 64 or 128. That is, the C-MN configuration(s) and C-SN configuration(s) for CSAC share the same configuration ID value space and the MN is not allowed to configure the same configuration ID value for a C-MN configuration and a C-SN configuration for CSAC. Each of the C-MN configuration(s) and the C-SN configuration(s) for CSAC has a unique configuration ID value. That is, the MN and the SN independently and assign configuration ID values to the C-MN configuration(s) and the C-SN configuration(s) for CSAC for the UE, and to the C-SN configuration(s) for CPAC for the UE, respectively. In another implementation, the MN uses a first configuration ID value space to assign configuration ID(s) (i.e., value(s)) for C-MN configuration(s) and uses a second configuration ID value space for C-SN configuration(s) for CSAC for the UE. For example, the first configuration ID value space includes 1, 2, . . . , M. M is a positive integer, e.g., 10, 16, 20, 32, 64 or 128. The second configuration ID value space includes 1, 2, . . . , N. N is a positive integer, e.g., 10, 16, 20, 32, 64 or 128. That is, the C-MN configuration(s) and C-SN configuration(s) for CSAC does not share the same configuration ID value space and the MN is allowed to configure the same configuration ID value for a C-MN configuration and a C-SN configuration for CSAC. The MN independently assigns a unique configuration ID value for each of the C-MN configuration(s) and a unique configuration ID value for each of the C-SN configuration(s). In some cases, the MN may assign the same configuration ID value to a C-MN configuration and a C-SN configuration for CSAC for the UE.

In other implementations, the MN and the SN share a configuration ID value space (or range) for C-MN configuration(s), C-SN configuration(s) for CSAC and C-SN configuration(s) for CPAC for the UE. That is, each of the C-MN configuration(s), C-SN configuration(s) for CSAC and C-SN configuration(s) for CPAC is assigned a unique configuration ID. Any two of the C-MN configuration(s), C-SN configuration(s) for CSAC and C-SN configuration(s) for CPAC cannot be assigned to the same configuration ID value. In this case, the MN may allocate a plurality of configuration ID values in the configuration ID value space to the SN so that the SN can assign one of the plurality of configuration ID values to a C-SN configuration for CPAC for the UE. That is, corresponding configuration IDs of the C-SN configuration(s) belong to the plurality of configuration ID values. In one implementation, the MN may indicate the plurality of configuration ID values in an interface message sent to the SN. The interface message can be a SN Request message (e.g., SN Addition Request or SN Modification Request).

The UE identifies a received conditional configuration include a C-MN configuration or C-SN configuration for CPAC or CSAC as described above. The received conditional configuration includes a configuration ID identifying the C-MN configuration or C-SN configuration for CPAC or CSAC. If the UE has not stored the configuration ID before receiving the conditional configuration, the UE adds (or stores) the C-MN configuration or C-SN configuration for CPAC or CSAC. If the UE has stored the configuration ID before receiving the conditional configuration, the UE updates (e.g., modifies or replaces) a stored C-MN configuration or C-SN configuration for CPAC or CSAC with the C-MN configuration or C-SN configuration for CPAC or CSAC in the received conditional configuration.

For further clarity, FIG. 21 illustrates an example method 2100 for conditionally carrying out a certain procedure, which can be implemented in the UE 102 of FIG. 1A. At block 2102, the UE receives conditional configuration information including a conditional configuration for a base station or cell, and a condition to be satisfied before the UE can apply the configuration (event 352, 458, 552, 652, 752; blocks 802, 902, 1002, 1102, 1202, 1302, 1402, 1502, 1602).

At block 2104, the UE determines to which conditional procedure the conditional configuration pertains (event 360, 460, 560, 660, 760; block 820, 822, 920, 922, 1020, 1022, 1120, 1122, 1220, 1222, 1322, 1324, 1422, 1424, 1520, 1524, 1620, 1624). At block 2106, the UE applies the configuration if the condition is satisfied (event 370, 470, 570, 670, 770).

Figure 22:
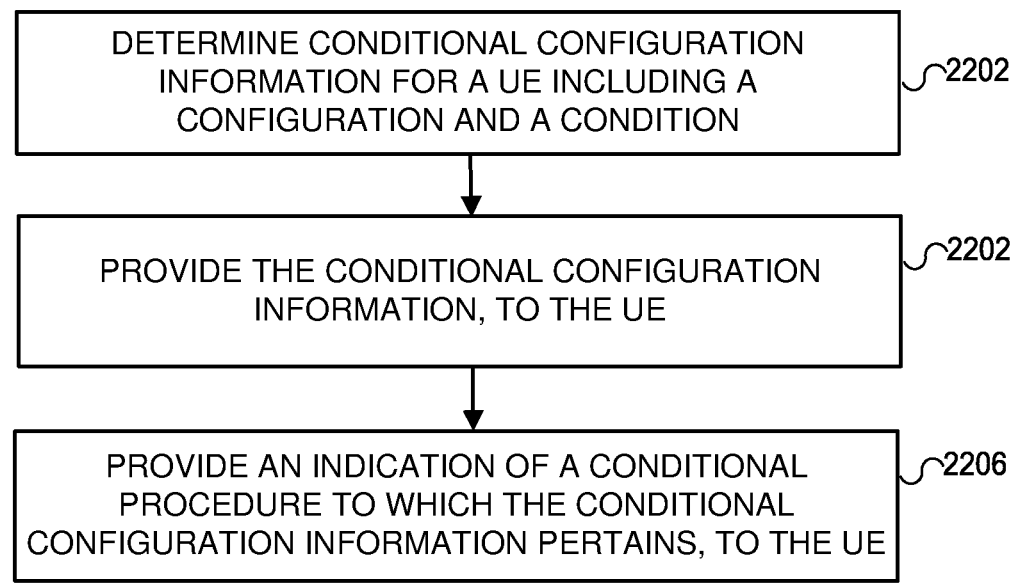
FIG. 22 is a flow diagram of an example method for conditionally configuring a UE, which can be implemented in a base station of FIG. 1A.

FIG. 22 is a flow diagram of an example method for conditionally configuring a UE, which can be implemented in a base station of FIG. 1A. At block 2202, the base station determines conditional configuration information for a UE (event 310, 410, 524, 634, 737; block 1801, 1901), including a conditional configuration and a condition. At block 2202, the base station provides the conditional configuration to the UE (event 352, 458, 552, 652, 752; blocks 802, 902, 1002, 1102, 1202, 1302, 1402, 1502, 1602). At block 2206, the base station provides an indication of a conditional procedure to which the conditional configuration pertains (block 810, 911, 1012, 1113, 1214, 1313, 1410, 1513, 1614, 2002).

Additional Considerations

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects another additional embodiment explicitly contemplated by the present disclosure.

Aspect 1. A method in a UE for conditionally carrying out a procedure comprises receiving, by processing hardware and from a radio access network (RAN), conditional configuration information including (i) a configuration related to a base station or a cell, and (ii) a condition to be satisfied before the UE applies the configuration; determining, by the processing hardware, a procedure to which the conditional information pertains; and applying, by the processing hardware and during the determined procedure, the configuration if the condition is satisfied.

Aspect 2. The method of aspect 1, wherein determining the procedure includes determining a type of a radio bearer on which the conditional information is received.

Aspect 3. The method of aspect 2, further comprising determining that the procedure is of a first type when the radio bearer is an SRB1; and determining that the procedure is of a second type when the radio bearer is an SRB3.

Aspect 4. The method of aspect 1, wherein determining the procedure includes determining whether the UE is operating in single connectivity (SC) or (DC).

Aspect 5. The method of aspect 4, including determining that the procedure is of a first type when the UE operates in SC; and determining that the procedure is of a second type when the UE operates in DC.

Aspect 6. The method of aspect 1, wherein determining the procedure includes determining a field or an information element (IE) with which the conditional information is associated.

Aspect 7. The method of aspect 6, including determining that the procedure is of a second type when a secondary cell group field dedicated to describing a secondary cell group indicates or references the configuration information; and determining that the procedure is of a first type when the configuration information is not included in, or referenced by, the secondary cell group field.

Aspect 8. The method of aspect 6, including determining that the procedure is of a first type when a first dedicated field includes or references the configuration information; and determining that the procedure is of a second type when a second dedicated field includes or references the configuration information.

Aspect 9. The method of aspect 1, wherein determining the procedure includes determining a radio access technology (RAT) over which the conditional information is received.

Aspect 10. The method of aspect 9, including determining that the procedure is of first type when the RAT corresponds to a less advanced technology; and determining that the procedure is of second type when the RAT corresponds to a more advanced technology.

Aspect 11. The method of aspect 1, wherein the conditional information includes a configuration identifier; and determining the procedure includes determining a range of values to which the configuration identifier belongs.

Aspect 12. The method of claim 11, including determining that the procedure is of first type when the configuration identifier belongs to a first range of values; and determining that the procedure is of second type when the configuration identifier belongs to a second range of values.

Aspect 13. The method of aspect 3, 5, 7, 8, 10, or 12, including determining that the procedure relates to a master node (MN) operating in the RAN when the procedure is determined to be of the first type; and determining that the procedure relates to a secondary node (SN) operating in the RAN when the procedure is determined to be of the second type.

Aspect 14. The method of aspect 13, wherein the procedure is a conditional handover procedure when the procedure relates to the MN.

Aspect 15. The method of aspect 13, wherein the procedure is one of a (i) conditional SN addition or change or (ii) a conditional primary secondary cell (PSCell) addition or change when the procedure relates to the SN.

Aspect 16. The method of aspect 1, wherein determining the procedure includes identifying one of (i) a conditional handover procedure, (ii) a conditional SN addition or change, or (iii) a conditional PSCell addition or change.

Aspect 17. The method of aspect 1, wherein receiving the configuration information includes receiving a radio resource control (RRC) reconfiguration message from an MN operating in the RAN.

Aspect 18. The method of aspect 1, wherein receiving the configuration information includes receiving an RRC reconfiguration message from an SN operating in the RAN.

Aspect 19. The method of aspect 17 or 18, wherein the RRC reconfiguration is included in an RRC container.

Aspect 20. The method of aspect 1, further comprising: receiving, by the processing hardware, a first measurement configuration from an MN operating in the RAN; receiving, by the processing hardware, a second measurement configuration from an SN operating in the RAN; and selecting, by the processing hardware and based on the determined procedure, a measurement configuration from the first measurement configuration and the second measurement configuration to use when evaluating the condition.

Aspect 21. The method of aspect 20, wherein selecting the measurement configuration includes: selecting the first measurement configuration when the procedure relates to the MN; and selecting the second measurement configuration when the procedure relates to the SN.

Aspect 22. A UE comprising processing hardware and configured to implement a method of any of the preceding aspects.

Aspect 23. A method in a base station for configuring a user equipment (UE), the method comprising determining, by processing hardware, conditional configuration information for the UE, the conditional configuration information including (i) a configuration related to a radio access network (RAN) and (ii) a condition to be satisfied before the UE applies the configuration; providing, by the processing hardware, the conditional configuration information to the UE; and providing, by the processing hardware to the UE, an indication of a procedure during which the UE is to apply the configuration if the condition is satisfied.

Aspect 24. The method of aspect 23, wherein providing the indication of the procedure includes transmitting the conditional configuration information via a signaling radio bearer 1 (SRB1) when the procedure is of a first type; and transmitting the conditional configuration information via a signaling radio bearer 3 (SRB3) when the procedure is of a second type.

Aspect 25. The method of aspect 23, wherein providing the indication of the procedure includes: transmitting the conditional configuration information using a first field or value when the procedure is of a first type; and transmitting the conditional configuration information using a second field or value when the procedure is of a second type.

Aspect 26. The method of aspect 23, wherein providing the indication of the procedure includes transmitting the conditional configuration information via a first radio access technology (RAT) when the procedure is of a first type; and transmitting the conditional configuration information via a second RAT when the procedure is of a second type.

Aspect 27. The method of any of aspects 24-26, wherein the first type of the procedure relates to a master node (MN); and the second type of the procedure relates to a secondary node (SN).

Aspect 28. The method of any of aspects 23-27, wherein the procedure is one of a (i) conditional SN addition or change or (ii) a conditional primary secondary cell (PSCell) addition or change when the procedure relates to the SN.

Aspect 29. A base station comprising processing hardware and configured to implement a method of any of aspects 23-28.

What is claimed is:

1. A method implemented in a user equipment (UE) for conditionally carrying out a procedure, the method comprising:

receiving, from a radio access network (RAN) and via a radio bearer, conditional configuration information including (i) a configuration related to a base station or a cell, and (ii) a condition to be satisfied before the UE applies the configuration;

determining that a procedure to which the conditional configuration information pertains is of a type involving a secondary node (SN) when (a) the radio bearer is a signaling radio bearer 1 (SRB1) and (b) the conditional configuration is included in a secondary cell group field that indicates or references the conditional configuration information; and applying, during the determined procedure, the configuration if the condition is satisfied.

2. The method of claim 1, wherein the procedure is one of a (i) conditional SN addition or change or (ii) a conditional primary secondary cell (PSCell) addition or change when the procedure relates to the SN.

3. The method of claim 1, wherein receiving the conditional configuration information includes receiving a radio resource control (RRC) reconfiguration message from a master node (MN) operating in the RAN.

4. The method of claim 1, further comprising:

receiving a first measurement configuration from an MN operating in the RAN;

receiving a second measurement configuration from an SN operating in the RAN; and selecting, based on the determined procedure, a measurement configuration from the first measurement configuration and the second measurement configuration to use when evaluating the condition.

5. A method implemented in a base station for configuring a user equipment (UE), the method comprising:

determining conditional configuration information for the UE, the conditional configuration information including (i) a configuration related to a radio access network (RAN) and (ii) a condition to be satisfied before the UE applies the configuration; and providing the conditional configuration information to the UE, including:

using a signaling radio bearer 1 (SRB1) as a radio bearer to transmit the conditional configuration to the UE and including the configuration in a secondary cell group field that indicates or references the conditional configuration information, where a procedure to which the conditional configuration information pertains is of a type involving a secondary node (SN).

6. The method of claim 5, wherein the providing of the conditional configuration information includes:

using the SRB1 as the radio bearer to transmit the conditional configuration information to the UE, when the procedure is of a type involving a MN.

7. A user equipment (UE) comprising processing hardware and configured to:

receive, from a radio access network (RAN) and via a radio bearer, conditional configuration information including (i) a configuration related to a base station or a cell, and (ii) a condition to be satisfied before the UE applies the configuration;

determine that a procedure to which the conditional configuration information pertains is of a type involving a secondary node (SN) when (a) the radio bearer is a signaling radio bearer 1 (SRB1) and (b) the conditional configuration is included in a secondary cell group field that indicates or references the conditional configuration information; and apply, during the determined procedure, the configuration if the condition is satisfied.

* * * * *